United States Patent
Yuan et al.

(10) Patent No.: US 7,684,701 B2
(45) Date of Patent: Mar. 23, 2010

(54) PHOTONIC QUANTUM INFORMATION SYSTEM USING UNPOLARISED LIGHT

(75) Inventors: Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 542 days.

(21) Appl. No.: 10/786,550

(22) Filed: Feb. 26, 2004

(65) Prior Publication Data

US 2004/0233935 A1    Nov. 25, 2004

(30) Foreign Application Priority Data

Mar. 6, 2003 (GB) ................................ 0305157.0

(51) Int. Cl.
*H04B 10/00* (2006.01)
*H04K 1/00* (2006.01)

(52) U.S. Cl. ................ 398/40; 398/39; 398/140; 398/152; 398/155; 380/255; 380/256; 380/277

(58) Field of Classification Search ........... 398/152, 398/39, 40, 184, 155, 202, 208, 212, 215; 380/256, 260, 277–283
See application file for complete search history.

(56) References Cited

U.S. PATENT DOCUMENTS

| | | | | |
|---|---|---|---|---|
| 5,329,393 A * | 7/1994 | Huang | ................ | 398/98 |
| 5,757,912 A * | 5/1998 | Blow | ................ | 380/256 |
| 5,966,224 A * | 10/1999 | Hughes et al. | ................ | 398/40 |
| 6,188,768 B1 * | 2/2001 | Bethune et al. | ................ | 380/278 |
| 6,438,234 B1 * | 8/2002 | Gisin et al. | ................ | 380/256 |
| 6,529,601 B1 * | 3/2003 | Townsend | ................ | 380/256 |
| 6,538,787 B1 * | 3/2003 | Moeller et al. | ................ | 398/158 |
| 6,654,103 B2 * | 11/2003 | Yu et al. | ................ | 356/73.1 |
| 6,714,742 B1 * | 3/2004 | Hayee et al. | ................ | 398/65 |
| 7,002,733 B2 * | 2/2006 | Dagenais et al. | ................ | 359/337 |
| 7,109,865 B2 * | 9/2006 | Paradiso et al. | ................ | 340/572.1 |
| 7,113,598 B2 * | 9/2006 | Flusberg et al. | ................ | 380/256 |
| 2002/0025041 A1 * | 2/2002 | Tomita | ................ | 380/256 |
| 2002/0097874 A1 * | 7/2002 | Foden et al. | ................ | 380/256 |
| 2002/0122180 A1 * | 9/2002 | Szafraniec | ................ | 356/451 |
| 2002/0196827 A1 * | 12/2002 | Shields et al. | ................ | 372/45 |
| 2003/0043467 A1 * | 3/2003 | Rosenfeldt | ................ | 359/618 |
| 2003/0058499 A1 * | 3/2003 | Reingand et al. | ................ | 359/135 |
| 2003/0175033 A1 * | 9/2003 | Taga et al. | ................ | 398/152 |
| 2004/0165808 A1 * | 8/2004 | Lauzon | ................ | 385/11 |

FOREIGN PATENT DOCUMENTS

| | | |
|---|---|---|
| EP | 0 909 045 A2 | 4/1999 |
| JP | 59-210414 | 11/1984 |
| JP | 6-102542 | 4/1994 |
| WO | WO 02/084337 A2 | 10/2002 |

* cited by examiner

*Primary Examiner*—Ken N Vanderpuye
*Assistant Examiner*—Li Liu
(74) *Attorney, Agent, or Firm*—Oblon, Spivak, McClelland, Maier & Neustadt, L.L.P.

(57) ABSTRACT

A photon emitter including a photon generator configured to generate photons having a first polarization state or a second polarization state, the first polarization state being orthogonal to the second polarization state; and a time delay device which delays photons having the second polarization state with respect to those having the first polarization state.

21 Claims, 14 Drawing Sheets

PHOTONIC QUANTUM INFORMATION SYSTEM USING UNPOLARISED LIGHT

BACKGROUND OF THE INVENTION (1) Field of Invention

The present invention relates to the field of photonic quantum information systems specifically those using unpolarised photon sources. The present invention is particularly intended for use in quantum communication. The present invention also extends to photon emitters and methods for outputting photons.

(2) Description of Related Art

In quantum communication systems, information is transmitted between a sender and a receiver by encoded single quanta, such as single photons. Each photon carries one bit of information encoded upon a property of the photon, such as its polarisation, phase or energy/time. The photon may even carry more than one bit of information, for example, by using properties such as angular momentum.

Quantum key distribution which is a technique for forming a shared cryptographic key between two parties; a sender, often referred to as "Alice", and a receiver often referred to as "Bob". The attraction of this technique is that it provides a test of whether any part of the key can be known to an unauthorised eavesdropper (Eve). In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

A photonic quantum computer or logic device is a device where gate operations are performed upon the encoded states of a number of single photon pulses in order to carry out some computation task. The single photon pulses will be provided either by an array of single photon sources or, alternatively using repeated emission from a single photon source with appropriate delays. In order for the logic gates to function properly it is often necessary for the photons to have the same polarisation.

Photonic quantum information systems are typically sensitive to the polarisation of the light used. For example, many photonic quantum communication systems encode information on the polarisation of the photons by applying a rotation to an initial polarisation state. However, this can only be done if the initial polarisation state is known. In other quantum communication systems, the information is encoded upon the phase of the photons in an interferometer. The components in the interferometer will often be sensitive to the polarisation of the photons. For example, the phase shift introduced by the phase modulator depends upon the polarisation of the photons. Thus photons in different polarisations will experience different phase shifts when passing the phase modulator.

To overcome the polarisation dependence of such systems, it is common to linearly polarise the light using a polarising filter. However, this has the disadvantage of reducing the efficiency of an unpolarised source. If for example the source is randomly polarised, this will reduce the bit rate by 50%. This problem is of particular concern for single photon sources where this loss cannot be compensated by increasing the intensity.

SUMMARY OF THE INVENTION

It is an object of the present invention to address this problem. Thus, in a first aspect, the present invention provides a photon emitter comprising:
 a photon generator configured to generate photons having a first polarisation state or a second polarisation state, the first polarisation state being orthogonal to the second polarisation state; and
 time delay means for delaying photons having the second polarisation state with respect to those having the first polarisation state.

Thus, since the photons with different polarisations are temporally separated, they may be treated differently by the following components and system. This allows all photons emitted from the generator to be used.

The photon generator may comprise weak pulses from a strongly attenuated laser or a single photon source which outputs single photons one at a time in response to optical or electrical stimulation. The generator may further comprise a polarising beamsplitter. In general photons emitted from the photon generator can have any polarisation direction. For example, some photons will have the first polarisation state, some will have the second polarisation state and others will have a polarisation state which is a mixture of the first and second states. These photons may then be passed through a polarising beamsplitter oriented to produce photons from the stream which either have the first polarisation state or the second polarisation state. The photon source may alternatively supply photons having either the first polarisation state or the second polarisation state.

The time delay means preferably comprises a polarising beamsplitter which directs photons having the first polarisation state along a first path and photons having the second polarisation state along a second path and combining means to combine the first and second paths, one of the paths being longer than the other path. For example, one of the paths may comprise a delay loop. If a polarising beamsplitter is provided in the generator, this polarising beamsplitter may also form part of the time delay means.

Thus, photons which follow the longer path will exit the emitter after the photons which have followed the shorter path ensuring that the two orthogonal polarisations are separated in time. This temporal separation between the photons allows them to be treated differently in the following apparatus or system.

For example, in a quantum communication system, the sender of the photons can encode photons emitted by the photon generator in the two orthogonal polarisations with different signals as they pass through the encoding equipment at different times. Similarly, the receiver of these photons may also distinguish between the two polarisations using their different arrival time.

One of the paths of the time delay means may be provided with means to rotate the polarisation of photons passing through said path such that photons from the first path and the second path at the combining means have the same polarisation. This may be achieved by using a polarisation rotation device or connecting a polarisation maintaining fibre such that the slow axis of the polarisation maintaining fibre is aligned to inject the desired polarisation into the following component to which it is connected. In this case the photons have the same polarisation leaving the time delay means. However, they may still behave differently in the sender's equipment and thus, may still need to be distinguished in time.

Instead of comprising two paths, the time delay means may comprise a single path configured to allow photons having a first polarisation state to travel at a different speed to photons with a second polarisation state. For example, this single path may be provided by polarisation maintaining fibre which causes photons which have their polarisation aligned along the slow axis of the fibre to travel slower along the fibre than photons whose polarisation is aligned with the fast axis of the fibre As previously mentioned, if the photon emitter is to be used for quantum cryptography, the emitter will further comprise encoding means, wherein photons which have passed through the time delay means are passed into an encoding means. Such encoding means may be used to encode the photon using quantum parameters such as polarisation, phase, energy/time etc. The photons may be encoded such that they have a certain bit value. For example, photons which are encoded with one polarisation axis may be allocated bit value '0' and those with an orthogonal polarisation axis may be allocated bit value '1'. Similarly, orthogonal phase states may be allocated bit values '0' and '1'.

If the encoding means are configured to encode the phase of a photon, they will preferably comprise an interferometer, said interferometer comprising an entrance coupler connected to a long arm and a short arm, said long arm and short arm being joined at their other ends by an exit coupler, one of said arms having phase variation means which allows the phase of a photon passing through that arm to be set to one of at least two values.

The photon emitter may be configured such that the entrance coupler has a first and second input and a first and second output, where the first and second output are connected to said long arm and short arm of the interferometer, and said entrance coupler also provides the combining means for the first path and the second path such that photons which follow the first path enter the entrance coupler by the first input and photons which follow the second path enter the entrance coupler by the second input. In this arrangement, the fact that the first input of the coupler is connected to one of the paths of the time delay means and the second input of the entrance coupler is connected to the other path of the time delay means, results in photons from the first path behaving differently in the interferometer from photons which followed the other path because they enter the interferometer via a different input. This is true even if the photons at the first and second input have the same polarisation.

In an alternative arrangement, photons from the first and second paths may enter the interferometer via the same input.

In a further arrangement, the photon emitter may be configured such that the first and second paths are multiplexed using a polarising beam combiner which is then fed into the encoding means.

The photons may also be encoded using polarisation instead of phase.

The encoding means of the above emitter, regardless of whether they are configured to encode information using polarisation and/or phase etc, is preferably capable of performing a different encoding operation on photons generated with the first polarisation state than on those with the second polarisation state.

As discussed above, photons with the first and second polarisation states may behave differently in the encoding means. Thus, by providing encoding means which are capable of performing different operations on photons having different polarisation states, it is possible to encode photons having the second polarisation state with the same bit value as photons having the first polarisation state. In other words, the encoding means is capable of compensating for the initial polarisation state of the photons.

Alternatively, photons with the first polarisation state may be encoded with a different bit value to the photons having the second polarisation state.

Where the photons are encoded using phase, the modulator in the interferometer is capable of providing a different modulation to photons which pass through the first path than those which path through the second path, such that photons exiting the interferometer have the same phase state regardless of their initial polarisation state.

For example, where photons generated with a first polarisation state are introduced into the interferometer via a first input of the entrance coupler and photons generated with the second polarisation state are introduced into the interferometer via a second input of the interferometer, the phase shifts applied by the modulator differ by 180° in order to encode the same bit value onto photons generated with either the first or second polarisation state.

Where photons are encoded using polarisation, the encoding means is configured to rotate the polarisation by angles differing by 90° such that the same bit value may be encoded onto photons generated with either the first or second polarisation state. Thus, depending on the bit value selected, the polarisation of photons generated with either the first or second polarisation state may be rotated accordingly.

The present invention may also be used to produce a source of polarised photons from an unpolarised source. This may be achieved by providing a polarisation rotator which rotates the polarisation of the delayed photons with a relative rotation of 90° with respect to the rotation applied to the non-delayed photons.

In a second aspect, the present invention provides a polarisation distinguisher for a photon generator configured to generate photons having a first polarisation state or a second polarisation state, the first polarisation state being orthogonal to the second polarisation state; said distinguisher comprising:

time delay means for delaying photons having the second polarisation state with respect to those having the first polarisation state.

The above polarisation distinguisher may be fitted to a photon generator to form a photon emitter which may be used or adapted as described with reference to the first aspect of the present invention.

Since the photon emitter is primarily intended for use in quantum communication system, a third aspect of the present invention provides a quantum communication system comprising:

a photon emitter comprising:
    a photon generator configured to generate photons having a first polarisation state or a second polarisation state, the first polarisation state being orthogonal to the second polarisation state;

time delay means for delaying photons having the second polarisation state with respect to those having the first polarisation state; and encoding means, wherein photons which have passed through the time delay means are passed into an encoding means, the communication system further comprising a receiver having decoding means and at least one detector.

In quantum key distribution the photons which are sent to the receiver are encoded. Each photon should be encoded independently of the other photons. Thus, if an eavesdropper intercepts a photon she does not gain any information about other photons being sent to the receiver. When a photon pulse is emitted by the generator it will either follow the short path or the long path through the time delay means. Thus, the time when a photon reaches the encoding means will depend on whether the photon took the long path or the short path through the time delay means. The encoding means may be configured to keep the same encoding for a photon regardless of whether it takes the long path or the short path through the time delay means because this encoding will only be applied to one photon. As explained above, the encoding means may be configured to compensate for the initial polarisation state of the photons such that the same bit value may be encoded onto photons regardless of their original polarisation state.

The photons may be encoded using phase, polarisation, energy/time etc.

Fibre based quantum cryptography systems, often use 1.3 μm or 1.55 μm photons for key transmission due to the relatively low fibre attenuation at those wavelengths. InGaAs avalanche photodiodes (APDs) are often used for single photon detection at these wavelengths.

Avalanche photodiodes sometimes produce a response when there is no photon incident upon the device, called a dark count. To minimise the dark count rate, the InGaAs APD can be operated in gated mode, for which the bias of the APD is raised to a value $V_{det2}$ above its breakdown voltage, thus activating single photon detection, for only the short time period when the signal pulse arrives. The detector time gate $d_{det}$ will typically be a few nanoseconds wide. In between detection gates, the APD voltage is held at a value $V_{det1}$ below the breakdown threshold and is thus not sensitive to light. The quantum cryptography system is well suited to gated operation mode, as the arrival time of each signal pulse is well defined.

Thus, the quantum communication system further comprises means to apply a gating signal to the detector, said gating signal being provided to switch the detector between an 'on mode' where photons may be detected and an 'off mode' where photons may not be detected.

In the above system, photons which are generated with a first polarisation state are separated in time from photons which are generated with a second polarisation state. Thus, a photon which is generated with a first polarisation state and follows a first path will arrive at the detector at a different time to a photon which was generated with a second polarisation state and takes the second path.

The detector may be gated on for the time when it expects to receive a photon which has followed the shortest path through the time delay means, until and including the time when it expects to receive a photon which has followed the longest path through the time delay means. Alternatively, the detector may be gated on only during the two time intervals when a photon is expected to arrive after following either the first or second paths through the time delay means and be in an 'off mode' for intermediate times.

The said encoding means of the quantum communication system may be configured to encode the phase of a photon and comprise a first interferometer, said interferometer comprising an entrance coupler connected to a long arm and a short arm, said long arm and short arm being joined at their other ends by an exit coupler, one of said arms having first phase variation means which allows the phase of a photon passing through that arm to be set to one of at least two values, the receiver comprising a second interferometer, the second interferometer comprising an entrance coupler connected to a long arm and a short arm, said long arm and short arm being joined at their other ends by an exit coupler, one of said arms having second phase variation means which allows the phase of a photon passing through that arm to be set to one of at least two values.

The at least two phase settings of the first interferometer preferably occupy non-orthogonal phase bases, for example one setting may be 0° while the other is 90°. In this case, a key may be distributed using the B92 protocol as explained in GB 2368502.

The phase variation means of the first interferometer preferably may be able to set the phase of a photon to one of four settings. Preferably, two of the four settings will occupy the same first basis whereas the other two settings will occupy a second basis, the first basis being non-orthogonal to the second basis. For example, the four settings may be 0°, 90°, 180° and 270°. In this case, a key may be distributed using the BB84 protocol as explained in GB 2368502.

Five or more settings may be used to allow encoding using intermediate basis as explained in GB 2368502.

The phase variation means of the second interferometer may be able to set the phase of a photon to one of two settings to select the measurement basis. For example, the receiver can use 0° or 90°. Typically, two detectors will be used, one connected to each output of the second interferometer.

When using the above system with the BB84 communication protocol, generally, the bit values associated with a particular detector differs between photons generated with the first or the second polarisation state.

When using the above system with the B92 protocol, generally, the detectors are used to distinguish the retained measurements for photons of the first or second polarisation state.

Only photon pulses which pass through the short arm of one interferometer and the long arm of the other are of use in distributing the key or other information between Alice and Bob. Thus, preferably, the detector is configured to ignore signals from photon pulses which pass through the long arms of both interferometers or the short arms of both interferometers.

The detector may be further configured to detect only those photons which pass the long arm of one interferometer and the short arm of the other. Thus, the detector may be gated in an on state only during the arrival time of photon pulses which pass the long arm of one interferometer and the short arm of the other interferometer.

Alternatively, the system may further comprise directing means configured to ensure that photons which have passed through the short arm of the first interferometer are directed down the long arm of the second interferometer and photons which have passed through the long arm of the first interferometer pass through the short arm of the second interferometer.

Such directing means may comprise first polarising means configured to allow photons which have travelled through different arms of the first interferometer different polarisations and second polarising means which distinguish between the photons having different polarisations and direct them down the appropriate arm of the second interferometer.

To optimise interference, it is desirable to ensure that photon pulses which take the short arm of the first interferometer and the long arm of the second interferometer take the same time to pass through both interferometers as photon pulses which pass through the long arm of the first interferometer and the short arm of the second interferometer. This may be achieved by providing means to vary or tune the path length of at least one of the arms of the interferometers.

The emitter and the receiver need to be synchronised. This may be done by communicating a clock signal between the emitter and receiver.

A clock pulse may be sent from the sender to the receiver with each photon from the generator.

The clock signal may have a different wavelength to that of the photons emitted by the photon generator and may be multiplexed and sent along the same fibre to the receiver.

Alternatively, or additionally, the clock signal may have a different polarisation to that of the photons from the generator. The clock pulse may also be delayed relative to the photon pulses from the generator, so that it can be detected in the receiving apparatus at a different time. Alternatively a timing reference may be used as the clock.

The detector is preferably an avalanche photodiode detector.

In a fourth aspect, the present invention provides a method of outputting photons, the method comprising:

providing a photon generator configured to generate photons having a first polarisation state or a second polarisation state, the first polarisation state being orthogonal to the second polarisation state; and delaying photons having the second polarisation state with respect to those having the first polarisation state.

Preferably, the above method further comprises separating photons having the first polarisation state from those having the second polarisation state.

The method may further comprise rotating the polarisation of the delayed photons by 90°.

The method may further comprise passing the photons through an interferometer and modulating the delayed photons as they pass through the interferometer such that photons which initially had the first and second polarisation states emerge from the interferometer with the same phase state.

BRIEF DESCRIPTION OF THE DRAWINGS

The present invention will now be described with reference to the following non-limiting preferred embodiments in which:

FIGS. 2(a) to 2(e) are a sequence of plots against time schematically how Alice should time her pulses and how Bob should gate the detector using the system of FIG. 1a and;

DETAILED DESCRIPTION OF THE INVENTION

Figure 1:
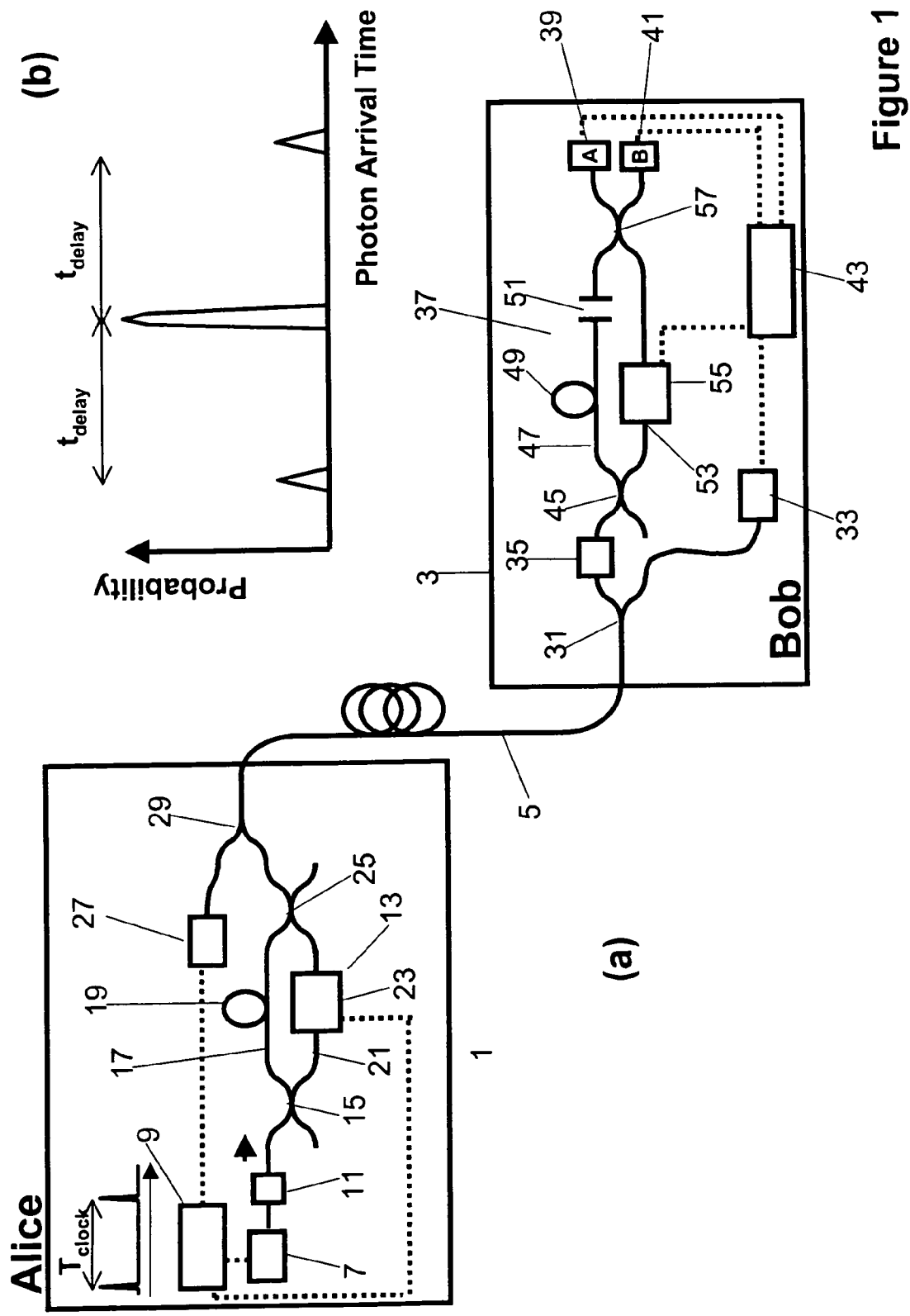
FIG. 1(a) is a communication system and FIG. 1(b) is a schematic plot of the probability of a photon being present in a pulse received by a detector against arrival time at the detector.

FIG. 1a shows a prior art apparatus for quantum key distribution between a sender, Alice 1 and a receiver, Bob 3 connected by an optical fibre 5.

Alice's equipment 1 comprises a single photon source 7.

The single photon source 7 produces a pulse containing a single photon during each clock cycle. The clock has a repetition period of $T_{clock}$. The clock cycle is controlled by biasing circuit 9.

The single photons are emitted from said single photon source 7 with random polarisations or a random mixture of two orthogonal polarisations. The single photons then pass through a polarising filter 11 that allows just one linear polarisation to pass. For an randomly polarised single photon source this results in half the incident photons being lost.

The polarised single photon pulses are then fed into one input arm of the imbalanced Mach-Zender interferometer 13 through a fibre optical coupler 15. The long arm 17 of the interferometer 13 contains an optical fibre delay loop 19, while the short arm 21 contains a fibre optic phase modulator 23. The length difference between the long arm 17 and the short arm 21 corresponds to an optical propagation delay of $t_{delay}$. Typically the length of the delay loop 19 is chosen to produce a delay $t_{delay}$~5 ns. A photon travelling through the long arm 17 will lag that travelling through the short arm 21 by a time of $t_{delay}$ at the exit 25 of the interferometer. The two arms are combined together with a fibre optic coupler 25.

The output of Alice's interferometer 13 is multiplexed with the bright clock laser 27 at the wavelength division multiplexing (WDM) coupler 29. The bright clock laser 27 is controlled by biasing circuit 9. The clock laser 27 may emit at a different wavelength from that of the single photon source 7, so as to facilitate their easy separation at Bob's end. For example the single photon source may operate at 1.3 µm and the clock laser at 1.55 µm or vice versa.

Bob's equipment 3 is similar to Alice's equipment 1 and comprises a WDM coupler 31, a clock recovery unit 33, a polarisation controller 35, an imbalanced Mach-Zender interferometer 37, two single photon detectors 39, 41 and biasing electronics 43.

Bob's interferometer 37 contains an entrance fibre coupler 45, a long arm 47 containing a delay loop 49 and a variable delay line 51, a short arm 53 containing a phase modulator 55, the long arm 47 and the short arm 53 are combined with an exit fibre coupler 57.

Bob first de-multiplexes the transmitted signal received from fibre 5 using the WDM coupler 31. The bright clock laser signal is routed to the clock recovery unit 33 to recover the clock signal for Bob to synchronise with Alice. The clock recovery unit 33 comprises an optical detector and other electronics such as an amplifier etc.

The single photon signal pulses received from fibre 5 are fed into a polarisation controller 35 to restore their original polarisation.

The signal pulses then pass Bob's interferometer 37. The long arm 47 of Bob's interferometer 37 contains an optical fibre delay loop 49 and a variable fibre delay line 51, and the short arm 53 contains a phase modulator 55. The long arm 47 and the short arm 53 are connected to a 50/50 fibre coupler 57 with a single photon detector 39, 41 attached to each output arm of the coupler 57.

To maximise the interference fringe visibility, the signal pulses at the two input arms of the exit coupler 57 of Bob's interferometer must be controlled to have same linear polarisation. This may be achieved by using a polarisation controller (not shown) on each of the inputs of the exit coupler 57.

The variable delay line 51 of Bob's interferometer 37 is adjusted to make the optical delay between its long arm 47 and short arm 53 identical as that between the long arm 17 and short arm 21 of Alice's interferometer 13, $t_{delay}$.

There are four possible paths for a signal pulse travelling from Alice's single photon emitter to Bob's single photon detectors:
  i) Alice's Long Arm 17-Bob's Long Arm 47 (Long-Long);
  ii) Alice's Short Arm 21-Bob's Long Arm 47 (Short-Long);
  iii) Alice's Long Arm 17-Bob's Short Arm 53 (Long-Short); and
  iv) Alice's Short Arm 21-Bob's Short arm 53 (Short-Long).

Bob's interferometer 37 is balanced so that photons taking paths (ii) and (iii) arrive at nearly the same time at the exit coupler 57 of Bob's interferometer 37, corresponding to the central peak in FIG. 1b. Photons taking path (i) have a positive delay $t_{delay}$ (later arrival time), and those taking path (iv) have a negative delay $t_{delay}$ compared to paths (ii) and (iii).

Only photons arriving in the central peak shown in FIG. 1b undergo interference. Thus only these photons are of interest. Bob gates his detectors 39, 41 to record only photons in the central peak and not those in the earlier or later satellite peak.

By controlling the voltages applied to their phase modulators 23, 55, Alice 1 and Bob 3 determine in tandem whether paths (ii) and (iii) undergo constructive or destructive interference at each detector 39, 41. The variable delay 51 can be set such that there is constructive interference at detector A 39 (and thus destructive interference at B 41) for zero phase difference between Alice and Bob's phase modulators. In this case and for a perfect interferometer with 100% visibility, we can then expect negligible count rate at detector B 41 and a finite count rate at A 39. If, on the other hand, the phase difference between Alice and Bob's modulators 23, 55 is 180°, we expect destructive interference at A 39 (and thus negligible count rate) and constructive at B 41. For any other phase difference between their two modulators 23, 55, there will be a finite probability that a photon may output at A 39 or B 41.

In the four-state protocol, which is sometimes referred to as BB84, [C H Bennett and G Brassard 1984, in Proceedings of the IEEE International Conference on Computers, Systems and Signal Processing, Bangalore, India (IEEE, New York), pp 175-179], Alice sets the voltage on her phase modulator 23 to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each single photon pulse and Alice records the phase shift applied for each clock cycle.

Meanwhile Bob randomly varies the voltage applied to his phase modulator 55 between two values corresponding to 0° and 90°. This amounts to selecting between the first and second measurement bases, respectively. Bob records the phase shift applied and the measurement result (i.e photon at A, photon at B, photon at A and B, or no photon detected) for each clock cycle.

In the BB84 protocol, Alice and Bob can form a shared key by communicating on a classical channel after Bob's measurements have taken place. Bob tells Alice in which clock cycles he measured a photon and which measurement basis he used, but not the result of the measurement. Alice then tells Bob the clock cycles in which she used the same encoding basis and they agree to keep only those results, as in this case Bob will have made deterministic measurements upon the encoded photons. This is followed by error correction, to remove any errors in their shared key, and privacy amplification to exclude any information known to an eavesdropper.

Figure 2:
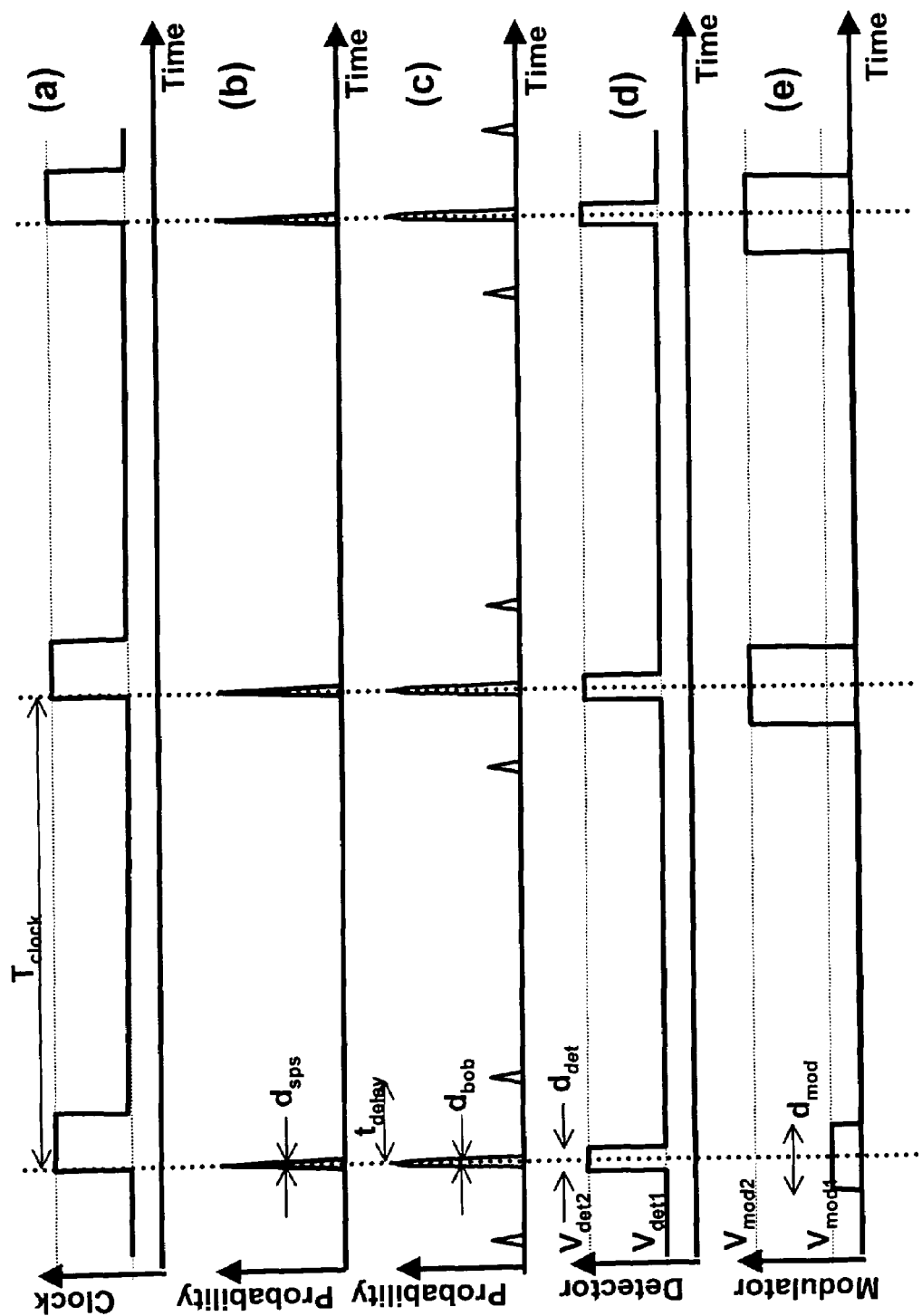

FIG. 2 shows the timing scheme for a prior art quantum cryptographic system.

FIG. 2a shows the clock signal as a function of time. The clock has a repetition period $T_{clock}$. The rising edge of the clock signal is used to synchronise Alice's single photon source 7, Alice's phase modulator 23, Bob's phase modulator 55 and Bob's detectors 39, 41.

For each clock period, the single photon source is triggered to produce one single photon pulse of width $d_{sps}$, see FIG. 2b. FIG. 2b is a plot of the probability of the output of the single photon source 7 against time.

FIG. 2c plots the probability of a photon arriving at Bob's detectors 39, 41 (i.e. sum of the probabilities at A 39 and B 41) as a function of time. Each single photon pulse now has a width of $d_{bob}$, which may be greater than $d_{sps}$ due to dispersion in the fibre. Three arrival windows can be seen for each clock cycle. In order of arrival time, these correspond to photons taking the short-short, long-short or short-long and long-long paths through Alice's-Bob's interferometer. Thus the first and second, as well as the second and third pulses are separated by a time delay $t_{delay}$.

Only photons arriving in the central window of each clock cycle undergo interference and are thus of interest. The single photon detectors 39, 41 are gated to be on only when the central pulse arrives in each clock cycle, as shown in FIG. 2d.

FIG. 2d is a plot of the gating bias applied to the detector against time. This is achieved by biasing the detector with a voltage $V_{det2}$ for which it is in an active state for a short duration $d_{det}$ during each clock cycle when the central pulse arrives. The bias voltage duration $d_{det}$ is typically chosen to be longer than $d_{bob}$ and is typically a few nanoseconds. At other times the detector is held at a voltage $V_{det1}$ for which it is inactive.

For a single photon detector based upon an avalanche photodiode, time gating can be achieved by choosing $V_{det2}$ to be greater than the avalanche breakdown voltage of the diode and $V_{det1}$ to be less than the breakdown voltage. An avalanche can only be triggered when the diode bias exceeds the breakdown threshold.

The avalanche process generates a large number of charge carriers within the diode. Some of these carriers may be localised at hetero-junctions or at trap states within the semiconductor. Carriers confined in such traps can have a lifetime of several microseconds. If the diode is biased above the avalanche breakdown threshold, before the trapped carriers have decayed, there is a possibility that a trapped carrier could be released and then trigger another avalanche. The resultant spurious signal is called an 'afterpulse'.

To minimising the rate of afterpulse counts, the APD has to be biased inactive for a sufficiently long time to allow most of the trapped charge to decay. Thus in a conventional quantum cryptography system, afterpulsing limits the minimum period between APD detection gates and thus the minimum clock period $T_{clock}$. Typically $T_{clock} \sim 1$ µs.

Alice's and Bob's phase modulators 23, 55 are driven by separate voltage pulse generators. The voltage pulse generators are also synchronised with the clock signal, as shown in FIG. 2e. FIG. 2e is a plot of the bias applied to the phase modulator against time. During the pass of each signal pulse through the phase modulator, the pulse generator outputs one of a number of voltage levels, $V_{mod1}, V_{mod2}$ etc. For the BB84 protocol, for instance, Alice applied one of four different voltage levels, corresponding to phase shifts of 0°, 90°, 180°, and 270°. Meanwhile Bob applies two voltage levels to his modulator corresponding to phase shifts of 0° and 90°. Alice and Bob vary the applied phase shifts for each signal pulse randomly and independently of one-another.

Figure 3:
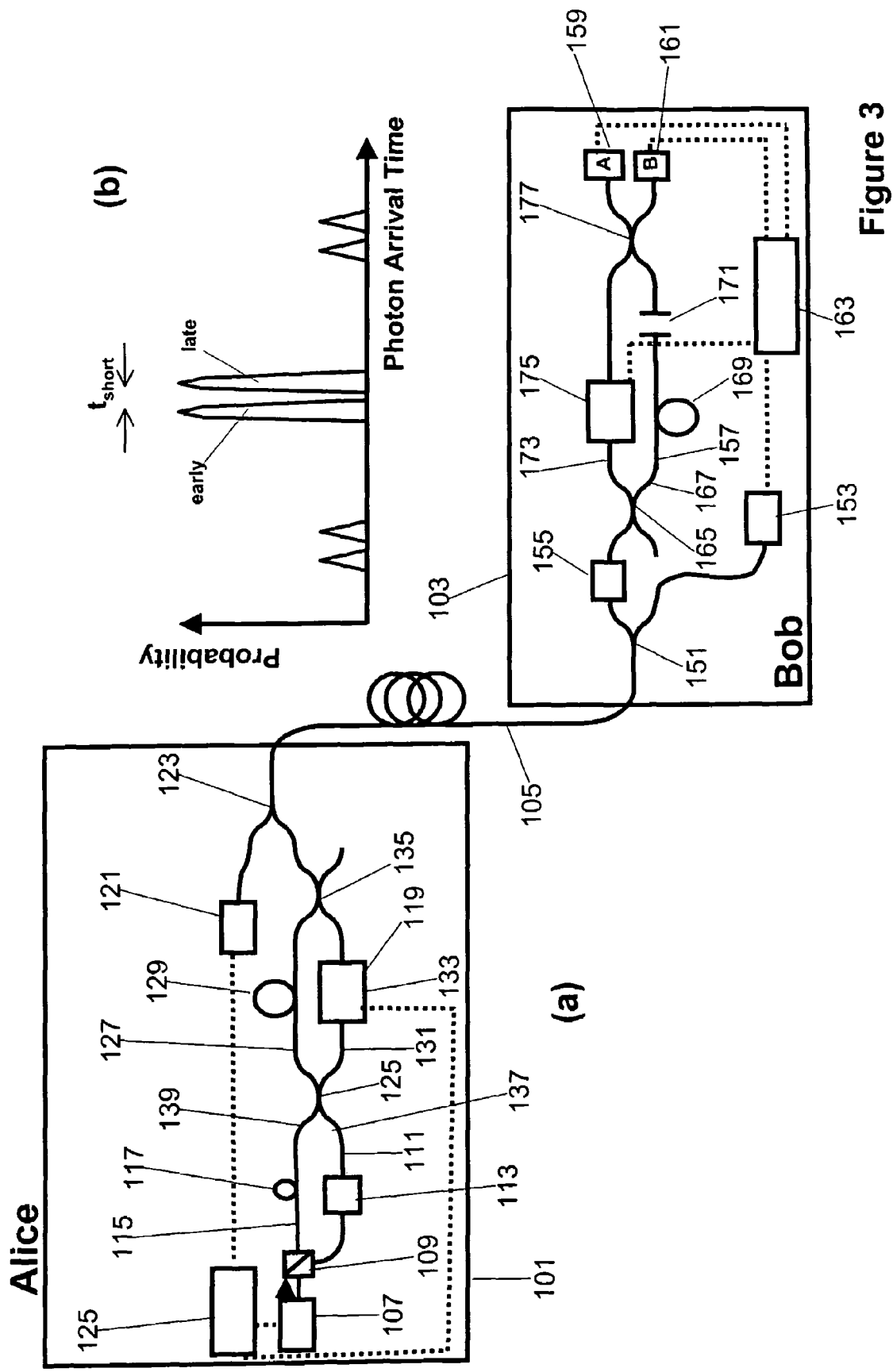
FIG. 3(a) is a communication system in accordance with an embodiment of the present invention using phase encoding and FIG. 3(b) is a schematic plot of the probability of a photon being present in a pulse received by a detector against arrival time at the detector.

FIG. 3a shows an apparatus for quantum cryptography using an unpolarised single photon source in accordance with an embodiment of the present invention. As described in relation to FIG. 1a, Alice 101 generates single photons, which she encodes and sends to Bob 103, along with a bright laser pulse to act as a clock signal.

Alice's equipment 101 comprises a single photon source 107, a polarising beamsplitter 109, an early path 111 containing a polarisation rotator 113, a late path 115 containing a short delay loop 117, an imbalanced fibre Mach-Zender interferometer 119, a bright clock laser 121, a wavelength division multiplexing (WDM) coupler 123 and biasing electronics 125. The interferometer 119 comprises an entrance fibre coupler 125, a long arm 127 with a loop of fibre 129 designed to cause an optical delay, a short arm 131 with a phase modulator 133, and an exit fibre coupler 135. The bias electronics 125 may comprise a timing unit, a driver for the single photon source 107, a driver for the clock laser 121 and a driver for the phase modulator 133.

The single photon pulses are generated by a single photon source 107. Typically each single photon pulse has a duration of $d_{sps}$=100 ps–1 ns. The single photons are emitted with a random polarisation or a random mixture of two orthogonal polarisations. The present scheme can make use of all the emitted polarisation states.

Photons emitted by the single photon source 107 are routed into a polarising beamsplitter 109 which separates the path of photons in two orthogonal polarisations. One of the output arms 111 of the polarising beamsplitter 109 is routed through a polarisation rotator 113, which rotates the polarisation by 90° and is connected to the second input 137 of Alice's imbalanced Mach-Zender interferometer 119. The other output arm 115 of the polarising beamsplitter 109 is routed through a short delay loop 117 and is then fed into the first input 139 of Alice's imbalanced Mach Zender interferometer 119. The short delay loop introduces a delay to the photons routed into the first input 139 of Alice's interferometer 119 of $t_{short}$ relative to photons routed into the second input 137.

The single photon pulses enter the imbalanced Mach-Zender interferometer 119 through a fibre optical coupler 125. The long arm 127 of the interferometer 119 contains an optical fibre delay loop 129, while the short arm 131 contains a fibre optic phase modulator 133. The length difference between the long arm 127 and the short arm 131 corresponds to an optical propagation delay of $t_{delay}$. Typically the length of the delay loop 129 may be chosen to produce a delay $t_{delay} \sim 5$ ns. A photon travelling through the long arm 127 will lag that travelling through the short arm 131 by a time of $t_{delay}$ at the exit of the interferometer 119. The two arms 127, 131 are combined together with a fibre optic coupler 135.

Alice applies a phase delay during the propagation of each signal pulse which is chosen at random from a fixed number of values. For the four-state protocol BB84 described below, for example, the phase delay is either 0°, 90°, 180° or 270°. Alice records the phase modulator 133 setting for each single photon pulse.

The output of Alice's interferometer 119 is multiplexed with the bright clock laser 121 at the WDM coupler 123. The clock laser 121 may emit at a different wavelength from that of the single photon source 107, so as to facilitate their easy separation by the receiver Bob 103. For example the single photon source 107 may operate at 1.3 µm and the clock laser 121 at 1.55 µm or vice versa.

The clock 121 may also be delivered in other ways. For example Alice may multiplex the signal pulses with a bright clock laser pulse at the same or different wavelength which is delayed relative to the start of the clock cycle and which does not coincide with the signal pulses. The bright clock pulse may also be prepared in an orthogonal polarisation state to the signal pulses. Alternatively the clock signal may be sent on a separate optical fibre. Alternatively, synchronisation may be achieved by using a timing reference.

The multiplexed signal and clock pulses are transmitted to the recipient Bob 103 along an optical fibre link 105.

Bob's equipment comprises a WDM coupler 151, a clock recovery unit 153, a polarisation controller 155, an imbalanced Mach-Zender interferometer 157, two single photon detectors 159, 161 and biasing electronics 163. Bob's interferometer 157 contains an entrance fibre coupler 165, a long arm 167 having a delay loop 169 and a variable delay line 171, a short arm 173 having a phase modulator 175, and an exit fibre coupler 177.

Bob first de-multiplexes the transmitted signal received from fibre 105 using the WDM coupler 151. The bright clock laser 121 signal is routed to a clock recovery unit 153 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. The efficiency of this scheme may be improved if Alice sends the clock in an orthogonal polarisation state to the signal pulses. Bob then uses a polarisation controller and a polarising beamsplitter to separate the signal and clock pulses. Alternatively Bob may detect the clock on a separate fibre or using a timing reference.

The single photon pulses are fed into polarisation controller 155 to restore their original polarisation.

The signal pulses then pass Bob's interferometer 157. The long arm 167 of Bob's interferometer 157 contains an optical fibre delay loop 169 and a variable fibre delay line 171, and the short arm 173 contains a phase modulator 175. The long arm 167 and the short arm 173 are connected to a 50/50 fibre coupler 177 with a single photon detector 159, 161 attached to each output arm.

To maximise the interference fringe visibility, the signal pulses at the two input arms of the exit coupler 177 of Bob's interferometer 157 must be controlled to have same linear polarisation. This can be achieved by using a polarisation controller (not shown) on each of the inputs of the exit coupler 177.

The variable delay line 171 at Bob's interferometer 157 is adjusted to make the optical delay between its two arms 167, 173 similar to that between the arms of Alice's interferometer 127, 131, $t_{delay}$.

The variable fibre delay line 171 can either be an airgap, or a fibre stretcher, driven by a piezo-electric actuator. Alternatively, the two delays can be balanced by carefully controlling the length of fibre in Alice's 119 and Bob's 157 interferometers. Fine adjustment of the length of the two optical paths can be achieved through the calibration of zero phase delay in the two modulators 133, 175.

Bob applies a phase delay during the propagation of each signal pulse which is chosen at random from a fixed number of values. For the four-state protocol BB84, for example, the phase delay is either 0° or 90°. Bob chooses the phase delay for each signal pulse randomly and independently of Alice. Bob notes the phase modulator 175 setting for each single photon pulse, as well as the result of the measurement: photon at A 159, photon at B 161, no photon detected, or photon at both A 159 and B 161.

There are four possible paths for each signal pulse travelling from Alice's single photon source to Bob's single photon detectors:

i) Alice's Long Arm 127-Bob's Long Arm 167 (Long-Long);
ii) Alice's Short Arm 131-Bob's Long Arm 167 (Short-Long);
iii) Alice's Long Arm 127-Bob's Short Arm 173 (Long-Short); and
iv) Alice's Short Arm 131-Bob's Short arm 173 (Short-Long).

The interferometer 157 is balanced so that photons taking paths (ii) and (iii) arrive at nearly the same time within the coherence time of the single photon source at the exit coupler 177 of Bob's interferometer 157. Photons taking path (i) have a positive delay $t_{delay}$, and those taking path (iv) have a negative delay $t_{delay}$ compared to paths (ii) and (iii).

There are 6 different time windows during which a single photon may arrive at Bob's detector 159, 161, as shown in FIG. 3b. Only the photons arriving during the central 2 time windows will undergo interference of paths (ii) and (iii). Thus only these photons are of interest and Bob gates his detectors 159, 161 to record only during these central 2 time windows.

The delay between signal pulses $t_{short}$ is chosen to be longer than the response time of the single photon detector 159, 161, so that Bob can distinguish the photons injected into the first input 139 of Alice's interferometer from those injected into the second input 137. For an InGaAs APD, for example, the response time is typically ~200 ps. Typically $t_{short}$ may be in the range 200 ps-5 ns. Typically $t_{short}$=2 ns is a convenient value.

The length of the delay loops 129, 169 in Alice's and Bob's interferometer 119, 157, as well as the length of Alice's short delay loop 117 is carefully selected so that the central arrival window of a photon injected into the first input 139 of Alice's interferometer will not temporally overlap with a satellite arrival time window of a photon input into the second input 137 of Alice's interferometer 119 or vice versa. This can be achieved if $t_{delay}$>$t_{short}$. For example $t_{delay}$=5 ns and $t_{short}$=2 ns.

The variable delay is set, and the phase modulators 133, 175 calibrated, such that for photons injected into the first input 139 of Alice's interferometer 133 there is constructive interference at detector A 159 (and thus destructive interference at B 161) for zero phase difference between Alice and Bob's phase modulators 133, 175.

By controlling the voltages applied to their phase modulators 133, 175, Alice and Bob determine in tandem whether paths (ii) and (iii) undergo constructive or destructive interference at each detector 159, 161. For the case of zero phase difference between the modulators 133, 175, negligible count rate at detector B 161 for photons injected into the first input 139 to Alice's interferometer 119 and a finite count rate at detector A 159 is expected. If, on the other hand, the phase difference between Alice and Bob's modulators 133, 175 is 180°, destructive interference at detector A 159 for photons injected into the first input 139 (and thus negligible count rate) and constructive at detector B 161 is expected. For any other phase difference between their two modulators 133, 175, there will be a finite probability that a photon may output at detector A 159 or detector B 161.

Photons injected into the first input 139 of Alice's interferometer 119 will behave differently to those injected into the second input 137. This effect is due to the fact that the photons enter the interferometer 119 through different arms of coupler 125. For instance, if photons injected into the first input 139 of Alice's interferometer 119 undergo constructive interference at detector A 159 and destructive interference at detector B 161, the photons injected into the second input 137 will undergo destructive interference at detector A 159 and constructive interference at detector B 161. Hence it is important that the photons injected into the first 139 and second 137 inputs of Alice's interferometer can be distinguished temporally. They can then either be modulated differently or the results of Bob's measurements can be interpreted differently, as described below. The photons injected into the first input 139 of Alice's interferometer are delayed relative to those input into the second input 137 and arrive at a later time, so that they can be distinguished.

Let us firstly consider the case that the results of Bob's measurements are interpreted differently according to whether the photons are injected into the first or second input port of Alice's interferometer. This case corresponds to the timing diagrams of FIGS. 4 and 5, described below.

In the four-state protocol, which is sometimes referred to as BB84, Alice sets the voltage on her phase modulator 133 to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each signal pulse. Alice notes the phase modulator setting for each single photon pulse.

Meanwhile Bob randomly varies the voltage applied to his phase modulator 175 between two values corresponding to 0° and 90°. This amounts to selecting between the first and second encoding bases, respectively. Bob records the phase shift applied, whether the photon was recorded in the first or second detection window and the measurement result (i.e detector A 159, detector B 161 or no photon detected) for each single photon pulse.

Bob associates a count in detector A 159 during the second detection window (i.e. for the photons arriving in the later window) with bit=0 and a count in detector B 161 during the second detection window with bit=1. While for the first detection window Bob associates a count in detector A 159 with bit=1 and a count in detector B 161 with bit=0.

In the BB84 protocol, Alice 101 and Bob 103 can form a shared key by communicating on a classical channel after Bob's measurements have taken place. Bob tells Alice in which clock cycle and signal pulse he measured a photon and which measurement basis he used, but not the result of the measurement. Alice then tells Bob the clock cycle and signal pulse in which she used the same encoding basis and they agree to keep only those results, as in this case Bob will have made deterministic measurements upon the encoded photons. Alice and Bob then share a common sifted key, although it may still contain some errors. They can then use classical routines for error correction, to remove any errors in their shared key, and privacy amplification to exclude any information potentially known to an eavesdropper.

In the B92 protocol, Alice sets the voltage on her phase modulator 133 to one of two different values, corresponding to phase shifts of 0° or 270°. Alice associates phase 0° with bit 0 and phase 270° with bit 1. The phase shift is chosen at random for each signal pulse. Alice notes the phase modulator setting for each single photon pulse. Meanwhile Bob randomly varies the voltage applied to his phase modulator 175 between two values corresponding to 180° and 90°. Bob associated a phase shift of 180° with bit 1 and 90° with bit 0.

The phase modulators are calibrated such that when Alice and Bob apply phase shifts of 0° to their modulators, the photon count in detector A 159 will be maximum (and thus it will be minimum in B 161) for photons injected into the first input of Alice's interferometer. Thus, for the photons injected into the first (second) input of Alice's interferometer, Bob knows that when he records a count in detector A (B), Alice's phase shift cannot differ from his by 180°. Thus, for the photons injected into the first input of Alice's interferometer, Bob retains the bit value when there is a count in detector A, as he knows it is the same as that of Alice's. While, for the photons injected into the second input of Alice's interferometer, Bob retains the bit value when there is a count in detector B, as again this ensures it is the same as that of Alice's. To form a shared key Bob tells Alice in which clock cycle he retained the bit value and they agree to keep only those results. Alice and Bob then share a common sifted key, although it may still contain some errors. They can then use classical routines for error correction, to remove any errors in their shared key, and privacy amplification to exclude any information potentially known to an eavesdropper.

Figure 4:
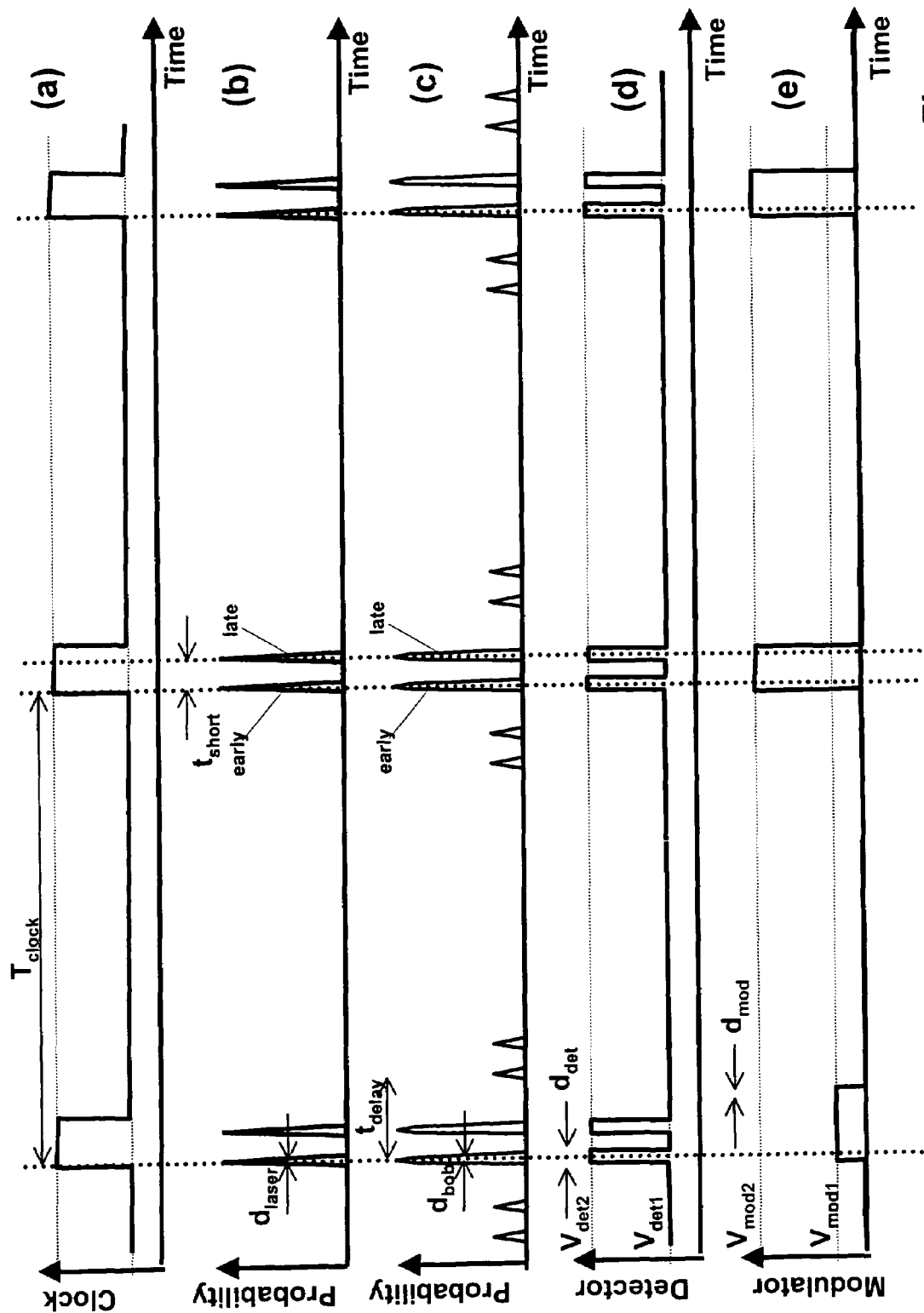
FIGS. 4(a) to 4(e) are a sequence of plots against time schematically showing how Alice should time her pulses and how Bob should gate the detector using the system of FIG. 3 and in accordance with an embodiment of the present invention.

FIG. 4 shows the timing for a quantum cryptography system with an unpolarised single photon source.

FIG. 4a shows the clock signal as a function of time. The rising edge of the clock pulses is used to define a reference for each clock cycle.

During each clock period $T_{clock}$, Alice's single photon source generates a single photon pulse of width $d_{sps}$. After passing through the short delay loop one of two orthogonal polarisation states generated by the single photon source is delayed by a time $t_{short}$ relative to the other, as shown in FIG. 4b. FIG. 4b is a plot of the probability of a pulse entering Alice's interferometer 119 as a function of time.

FIG. 4c plots the probability of a photon arriving at Bob's detectors (i.e. sum of the probabilities at detector A 159 and detector B 161) as a function of time. Each pulse now has a width of $d_{bob}$, which may be greater than $d_{sps}$ due to dispersion in the fibre. Photons may arrive in any one of 6 time windows during each clock cycle. The first 2 pulses correspond to photons taking the short arm 131 through Alice's interferometer 119 and the short arm 173 through Bob's interferometer 157. The central 2 pulses correspond to photons taking the short-long or long-short paths (paths (ii) or (iii)). The final 2 pulses correspond to those taking the long-long path (path (i)).

Only photons arriving in the central 2 time windows of each clock cycle undergo interference and are thus of interest. The single photon detectors 159, 161 are gated to be on only during the central 2 time windows in each clock cycle, as shown in FIG. 4d. FIG. 4d is a plot of the detector bias against time. This is achieved by biasing the detector 159, 161 with a voltage $V_{det2}$ for which it is in an active state for N short gates of duration $d_{det}$ coinciding with the central 2 time windows. At other times the detector 159, 161 is held at a voltage $V_{det1}$ for which it is inactive. The bias duration $d_{det}$ is chosen to be longer than the width of the arriving pulse $d_{bob}$.

For the case of using an APD as the single photon detector, the APD will be biased above breakdown twice within each clock cycle in close succession. If a photon is detected in the first time window, and thus an avalanche triggered, it is very likely that an afterpulse count will be generated in the second detection window. Thus if a photon is detected during the first detection window, the second detection window is ignored.

Alice 101 and Bob's 103 phase modulators 133, 175 are driven by separate voltage pulse generators. The voltage pulse generators are synchronised with the clock signal, as shown in FIG. 4e. Explicitly, FIG. 4e is a plot of the phase modulator bias against time. During the pass of each single photon pulse through the phase modulator, the pulse generator outputs one of a number of voltage levels, $V_{mod1}$, $V_{mod2}$ etc, as shown in FIG. 4e. For the BB84 protocol, for instance, Alice applied one of four different voltage levels, corresponding to phase shifts of 0°, 90°, 180°, and 270°. Meanwhile Bob applies two voltage levels to his modulator corresponding to phase shifts of 0° and 90°. Alice and Bob vary the applied phase shifts for each signal pulse randomly and independently of one-another. As can be seen in FIG. 4e the same modulation is applied to photons injected into the first and second input of Alice's interferometer.

Figure 5:
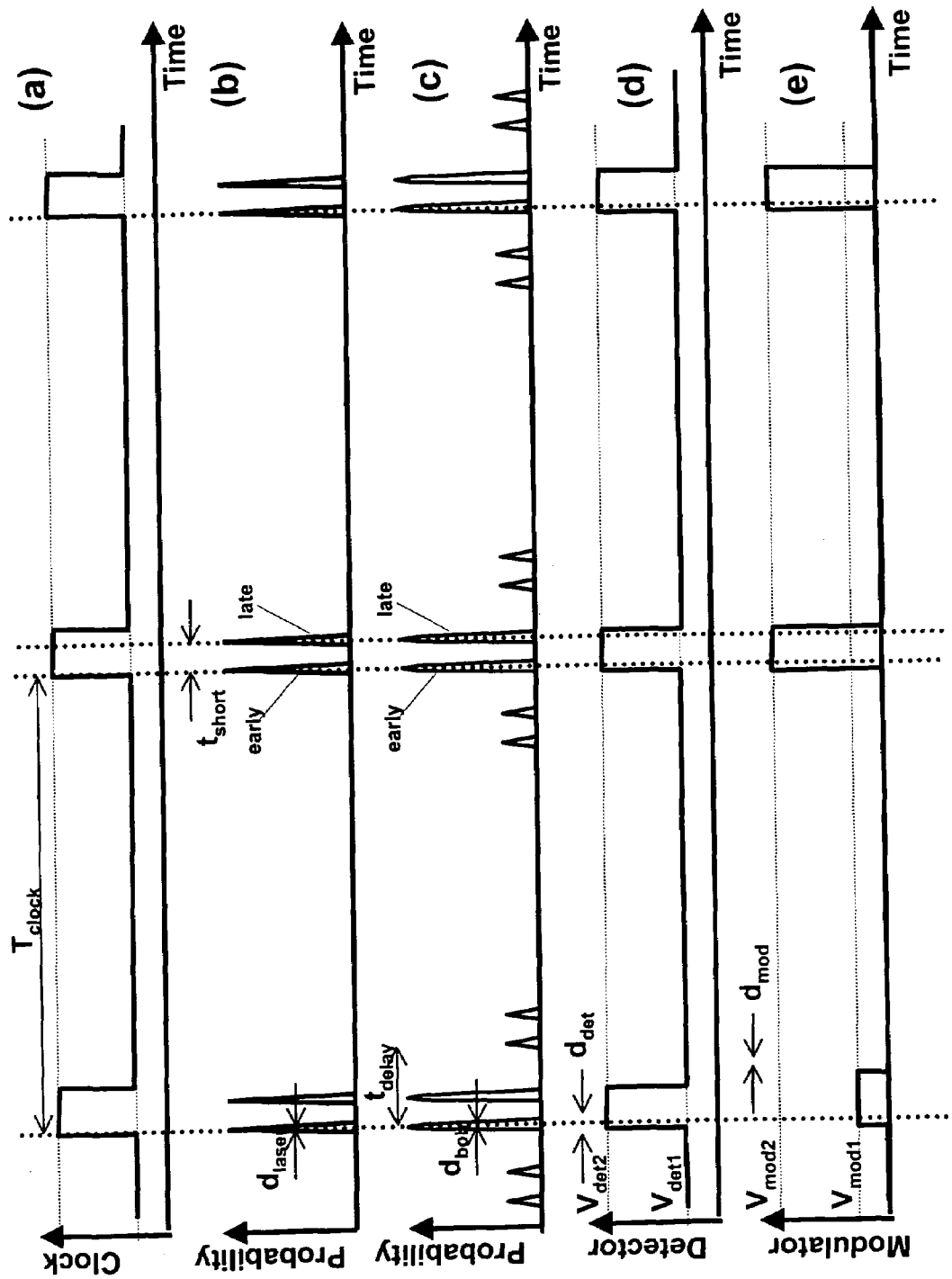
FIGS. 5(a) to 5(e) are an alternative sequence of plots against time schematically showing how Alice should time her pulses and how Bob should gate the detector using the system of FIG. 3 and in accordance with an embodiment of the present invention.

FIG. 5 shows another scheme for gating the detector. In this scheme, a single gate is applied to the detector during each clock cycle.

FIG. 5a is a plot of the clock signal against time as per FIG. 4a.

FIG. 5b is a plot of the probability of a photon pulse entering Alice's interferometer 119 against time as per FIG. 4b.

FIG. 5c is a plot of probability of a photon pulse arriving at either detector 159 and 161 as per FIG. 4c.

FIG. 5d is a plot of the detector bias against time. The single gate has a longer duration $d_{det}$ than in FIG. 4d, so as to detect photons injected into both the first and second input of Alice's interferometer. The detection time is used to determine to which signal pulse within a clock cycle a detected photon belongs. Only the first detected photon within each clock cycle is retained.

FIG. 5e is a plot of the bias applied to the modulator as a function of time.

Figure 6:
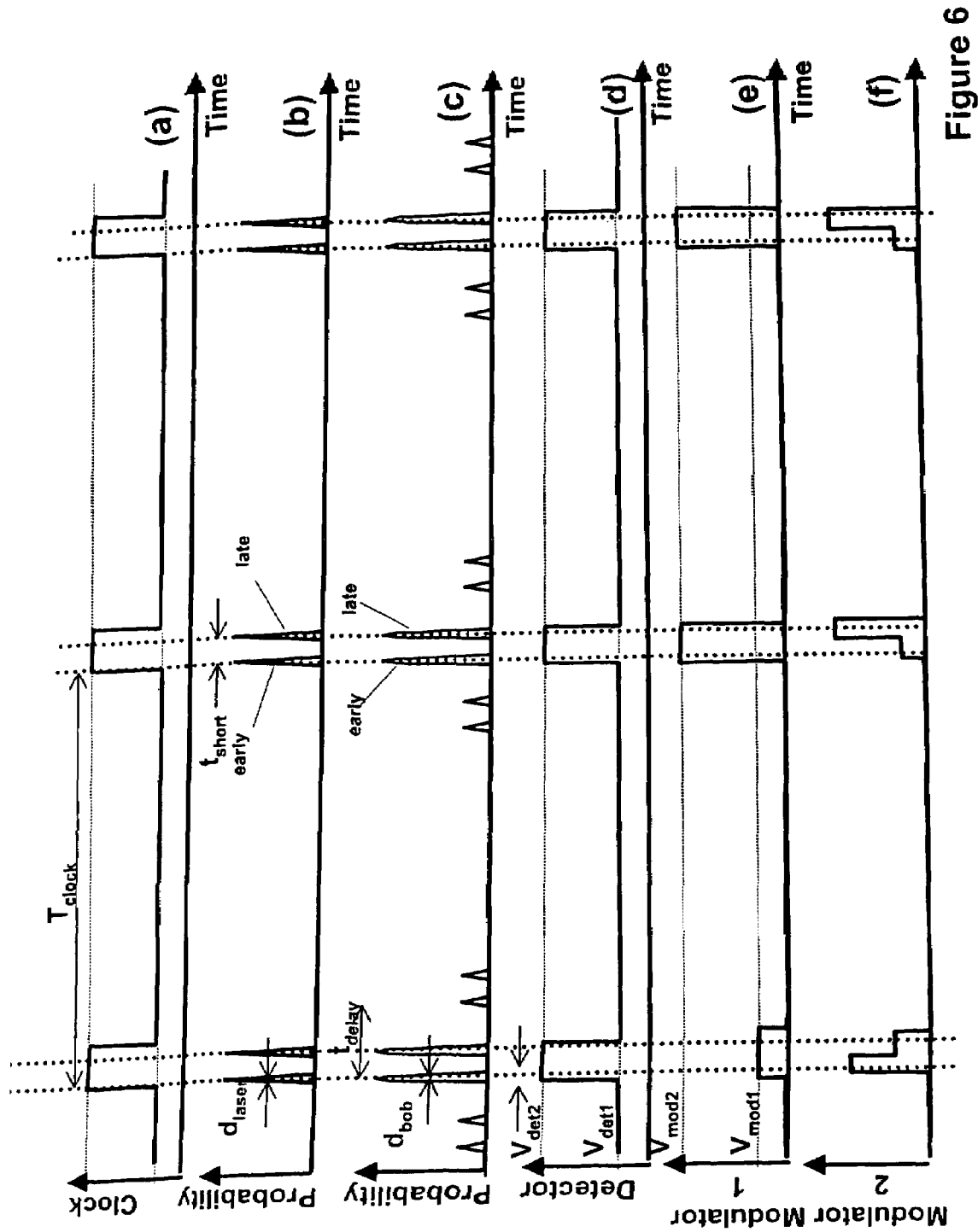
FIG. 6(a) to 6(f) are an alternative sequence of plots against time schematically showing how Alice should time her pulses and how Bob should gate the detector using the system of FIG. 3 and in accordance with an embodiment of the present invention.

The different interference behaviour of photons injected into the two inputs of Alice's imbalanced interferometer 131 can be compensated by using different driving voltages of either Alice's 133 or Bob's phase modulator 175. One of the two parties, Alice or Bob, modulates the signal pulses from the early input 111 and the late input 177 differently. This is illustrated in FIG. 6 for the case that Bob modulates photons injected into the two inputs of Alice's interferometer differently.

In the four-state protocol, which is sometimes referred to as BB84, [C H Bennett and G Brassard 1984, in the proceedings of the IEEE International Conference on Computers, Systems and Systems and Signal Processing, Bangalore, India (IEEE, New York), pp 175-179]. Alice still uses 4 different voltages for her phase modulator, and associates 0° and 180° for bits 0 and 1 when encoding the late signal pulse with the first basis, but she associates 180° and 0° for bits 0 and 1 when encoding the early signal pulse. When encoding with second basis, Alice uses 90° and 270° for bits 0 and 1 for the late signal pulse, but 270° and 90° for bits 0 and 1 for the early signal pulse. The bit is chosen random for each single photon pulse, but the encoding the late signal pulse and the early pulse differently. Alice records each bit she used for each clock cycle.

Meanwhile Bob randomly varies the voltage applied on his phase modulator 175 between two values corresponding to 0° and 90° phase delay. This amounts to selecting between the first and second measurement bases, respectively. Bob records the phase shift applied and the measurement result.

Bob associates a count in detector A 159 with bit=0, and a count in detector B 161 with bit=1 for BOTH photons injected into the first or second input of Alice's interferometer. In this case, the different interference behaviour of the photons injected into the first and second inputs of Alice's interferometer is compensated by Alice's phase modulator. For the same reason, Bob does not need to distinguish counts from the early or late path.

The different behaviour between early and late signal pulses can also be compensated by Bob's phase modulator 175. Alice's phase modulator 119 treats the early and late pulses in the same way, but Bob's phase modulator 175 treats them differently. Bob associates 0° and 90° for the late signal pulse, but 180° and 270° for the early signal pulse.

Two-state protocol, often referred as B92 protocol, can also be implemented in such phase-compensated scheme.

FIG. 6 shows another timing scheme for a quantum cryptography system with unpolarised single photon source. In this scheme, one of the phase modulators treats the early and late signal pulses differently.

FIG. 6a is a plot of the clock signal against time as per FIG. 4a.

FIG. 6b is a plot of the probability of a photon pulse entering Alice's interferometer 119 against time as per FIG. 4b.

FIG. 6c is a plot of probability of a photon pulse arriving at either detector 159 and 161 as per FIG. 4c.

FIG. 6d is a plot of the detector bias against time. The single gate has a longer duration $d_{det}$ than in FIG. 4d, so as to detect photons injected into both the first and second input of Alice's interferometer.

The single photon detectors 159, 161 can also be gated to be on only during the two central 2 time windows in each clock cycle, as per FIG. 4d.

FIG. 6e is a plot of the bias applied to one of the two modulators as a function of time.

FIG. 6f is a plot of the bias applied to the other of the two modulators as a function of time. This phase modulator treats the early and the late signal pulses differently.

Figure 7:
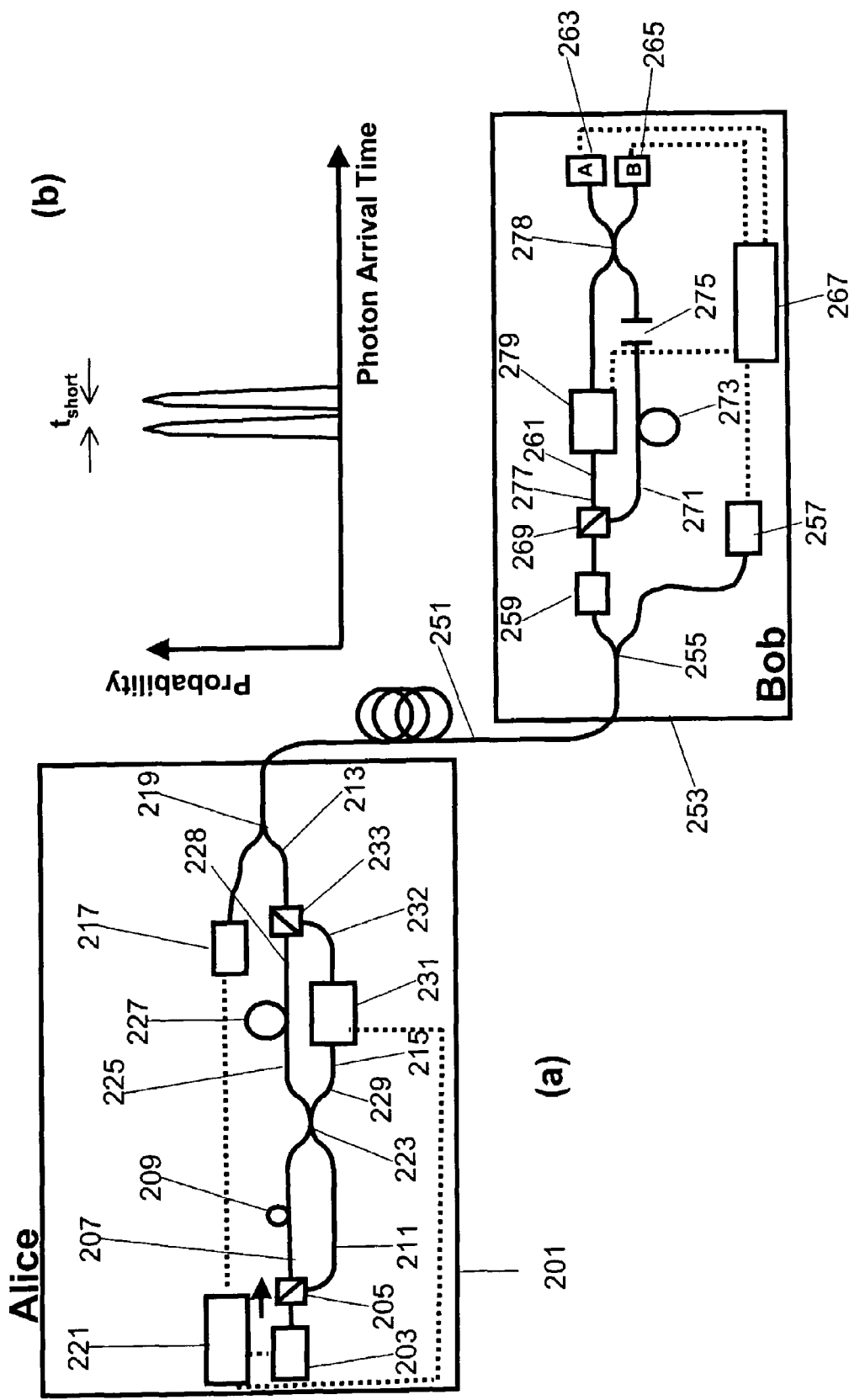
FIG. 7(a) is a communication system in accordance with a further embodiment of the present invention using phase encoding and FIG. 7(b) is a schematic plot of the probability of a photon being present in a pulse received by a detector against arrival time at the detector.

FIG. 7a shows a quantum cryptography system using an unpolarised single photon source and based upon phase encoding in a polarisation sensitive fibre interferometer.

Alice's equipment 201 comprises a single photon source 203, a polarising beamsplitter 205, a late path 207 containing a short delay line 209 of polarisation maintaining fibre, an early path 211 containing a polarisation maintaining fibre, an imbalanced fibre Mach-Zender interferometer 215, a bright clock laser 217, a wavelength division multiplexing (WDM) coupler 219 and bias electronics 221. The interferometer 215 comprises of an entrance polarisation maintaining coupler 223, a long arm -225 with a loop of fibre 227 designed to cause an optical delay, a short arm 229 with a phase modulator 231, and an exit polarising beam combiner 233. All components used in Alice's interferometer 215 are polarisation maintaining.

Single photon pulses are generated by a single photon source 203 with a random polarisation or a random mixture of two orthogonal linear polarisations.

The randomly polarised single photon pulses are fed into the polarising beamsplitter 205. The first output of the polarising beamsplitter 205 is connected to the first input of a polarisation maintaining coupler 223 via a short polarisation maintaining delay loop 207, 209 (late path). The second output of the polarising beamsplitter 205 is connected to the second input of a polarisation maintaining coupler 223 through a polarisation maintaining fibre 211 (early path). The late path 207 is longer than the early path 211, with the effect that photons taking the late path 207 are delayed relative to those taking the early path 211 by a time $t_{short}$. The two outputs of the polarising beamsplitter 205 are aligned such that the two output polarisations are both coupled into a particular axis, usually the slow axis, of the polarisation maintaining fibre. This ensures that signal pulses taking either the late 207 or early 211 paths will have the same polarisation at the polarisation maintaining coupler 223.

The single photon pulses which now have the same polarisation, are then fed into the imbalanced Mach-Zender interferometer 215 through a polarisation maintaining coupler 223. The long arm 225 of the interferometer 215 contains an optical fibre delay loop 227, while the short arm 229 contains a fibre optic phase modulator 231. The length difference between the long arm 225 and the short arm 229 corresponds to an optical propagation delay of $t_{delay}$. Typically the length of the delay loop may be chosen to produce a delay $t_{delay}$~5 ns. A photon travelling through the long arm 225 will lag that travelling through the short arm 229 by a time of $t_{delay}$ at the exit 233 of the interferometer 215.

The long arm 225 and the short arm 229 are combined together with a polarisation beam combiner 233 into a single mode fibre 213. The fibre inputs of the polarisation beam combiner 233 are aligned in such a way that only photons polarised along a particular axis of the polarisation maintaining fibre, usually the slow axis, are output from the combiner 233. For example, at the in-line input port 228, only photons polarised along the slow axis of the in-line input fibre are transmitted by the beamsplitter and pass into the output port and photons polarised along the fast axis are reflected and lost. Meanwhile, at the 90° input port 232, only photons polarised along the slow axis of the 90° input fibre are reflected by the beamsplitter 233 and pass into the output port, while those polarised along the fast axis will be transmitted and lost. This means that the slow axis of one of the two input fibres is rotated by 90° relative to the output port. Alternatively the polarisation may be rotated using a polarisation rotator before one of the input ports of the polarising beam combiner. Photon pulses that passed through the long 225 and short -229 arms will have orthogonal linear polarisations when output from the combiner 233.

The single photon pulses are then multiplexed with a bright laser clock source 217 at a different wavelength using a WDM coupler 219. The multiplexed signal is then transmitted to the receiver Bob 253 along an optical fibre link 251.

The clock may also be delivered in other ways. For example Alice may multiplex the signal pulses with a bright clock laser 217 pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

Bob's setup contains a WDM coupler 255, a clock recovery unit 257, a polarisation controller 259, an imbalanced Mach-Zender interferometer 261, two single photon detectors 263, 265 and biasing electronics 267. Bob's interferometer 261 contains an entrance polarising beamsplitter 269, a long arm 271 containing a delay loop 273 and a variable delay line 275, a short arm 277 containing a phase modulator 279, and an exit polarisation maintaining 50/50 fibre coupler 278. All components in Bob's interferometer 261 are polarisation maintaining.

Bob first de-multiplexes the transmitted signal received from fibre 251 using WDM coupler 255. The bright clock laser 217 signal is routed to an optical receiver 257 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively Bob may detect the clock on a separate fibre or using a timing reference.

The single photon pulses are fed into a polarisation controller to restore the original polarisation of the signal pulses. This is done so that signal pulses that travelled the short arm in Alice's interferometer, will pass the long arm in Bob's interferometer. Similarly, single photon pulses which travelled the long arm at Alice will travel the short arm at Bob.

The single photon pulses then passes Bob's interferometer 261. The entrance polarising beamsplitter 269 divides the incident pulses with orthogonal linear polarisation. The two outputs of the entrance polarisation beamsplitter 269 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler. The long arm 271 of Bob's interferometer 261 contains an optical fibre delay loop 273 and a variable fibre delay line 275, and the short arm 277 contains a phase modulator 279. The two arms 271, 277 are connected to a 50/50 polarisation maintaining fibre coupler 278 with a single photon detector A, 263, B, 265 attached to each output arm.

Due to the use of polarising components, there are only two routes for a signal pulse travelling from the entrance of Alice's interferometer to the exit of Bob's interferometer:
  (i) Alice's Long Arm 225-Bob's Short Arm 277 and
  (ii) Alice's Short Arm 229-Bob's Long Arm 271.

The variable delay line 275 at Bob's interferometer 261 is adjusted to make the length of routes (i) and (ii) almost equal within the coherence time of the single photon source and thereby ensure interference of the two paths. The variable fibre delay line 275 can either be an airgap, or a fibre stretcher, driven by a piezo-electric actuator. Alternatively, the two delays can be balanced by carefully controlling the length of fibre in Alice's and Bob's interferometers. Fine adjustment of the length of the two optical paths can be achieved through the calibration of zero phase delay in the two modulators 231, 279.

FIG. 7b is a plot of the probability of a photon arriving at either of Bob's detectors 263, 265 against time. Due to the restrictions on the possible paths which photons may take provided by polarisation combiner 233 and polarising beamsplitter 269 only two central peaks are noted.

Figure 8:
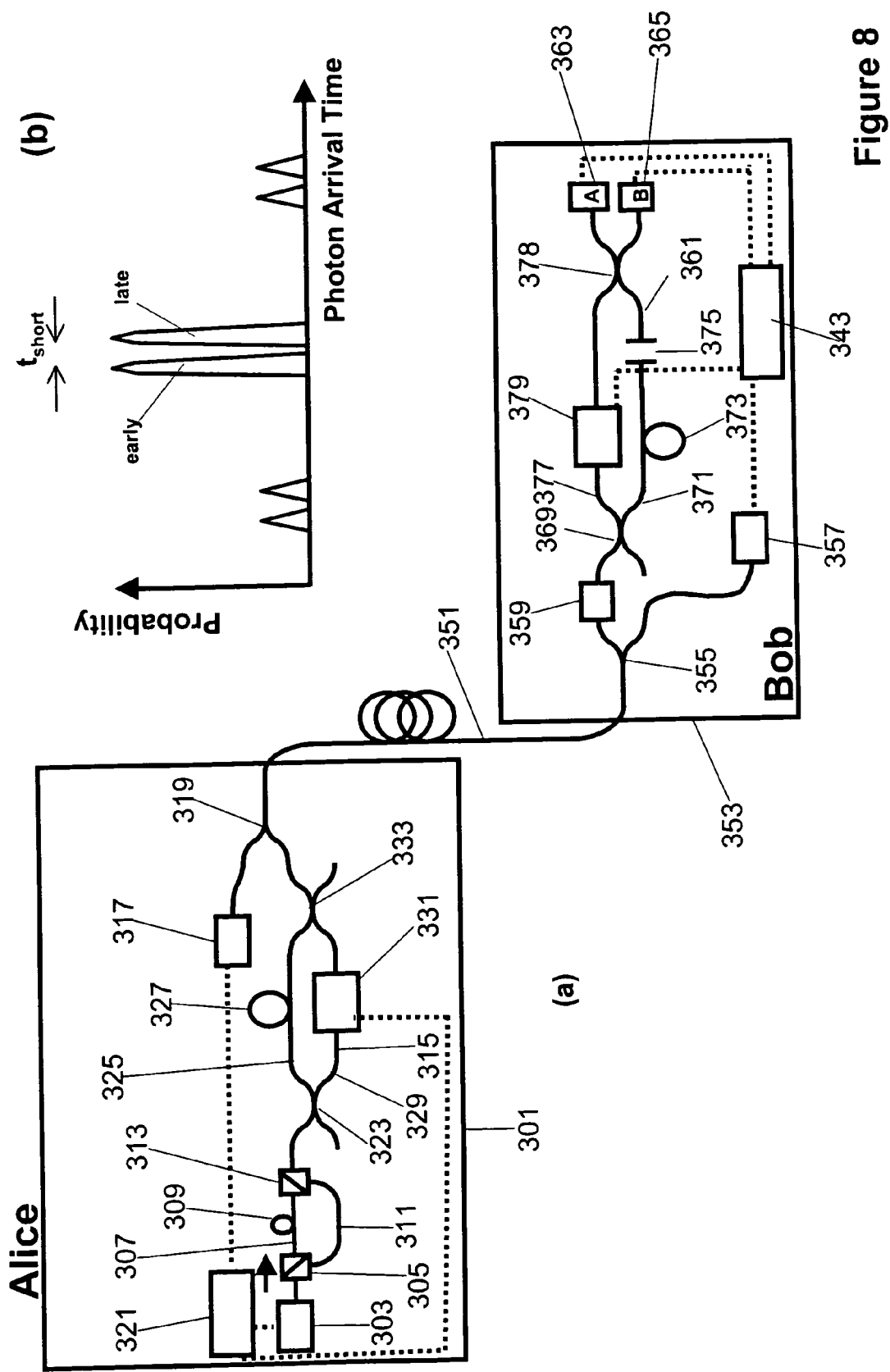
FIG. 8(a) is a communication system in accordance with a further embodiment of the present invention using phase encoding and FIG. 8(b) is a schematic plot of the probability of a photon being present in a pulse received by a detector against arrival time at the detector.

FIG. 8a shows a quantum cryptography system using an unpolarised single photon source and based upon phase encoding in a polarisation sensitive fibre interferometer.

Alice's equipment 301 contains a single photon source 303, a polarising beamsplitter 305, a late path 307 comprising a short delay line 309 of polarisation maintaining fibre, an early path 311 comprising a polarisation maintaining fibre 311, a polarising beam combiner 313, an imbalanced fibre Mach-Zender interferometer 315, a bright clock laser 317, a wavelength division multiplexing (WDM) coupler 319 and bias electronics 321. The interferometer 315 consists of an entrance polarisation maintaining coupler 323, a long arm 325 with a loop of fibre 327 designed to cause an optical delay, $t_{delay}$, a short arm 329 with a phase modulator 331, and an exit fibre coupler 333. All components used in Alice's interferometer 315 are polarisation maintaining.

Single photon pulses are generated by a single photon source 303 with a random polarisation or a random mixture of two orthogonal linear polarisations.

The randomly polarised single photon pulses are fed into the polarising beamsplitter 305. The first output of the polarising beamsplitter 305 is connected to the first input of a polarising beam combiner 313 via a short polarisation maintaining delay loop 307, 309 (late path). The second output of the polarising beamsplitter 305 is connected to the second input of the polarising beam combiner 313 through a polarisation maintaining fibre 311 (early path). The late path 307 is longer than the early path 311, with the effect that photons taking this path are delayed relative to the other by a time $t_{short}$. The two outputs of the polarising beamsplitter 305 and the two inputs of the polarising beam combiner 313 are aligned to a particular axis, usually the slow axis, of the polarisation maintaining fibre. Photons taking the two different paths are orthogonally polarised and separated in the clock cycle relative to one another.

The late and early signal pulses are fed through the same input arm of the entrance fibre coupler 323 into the imbalanced Mach-Zender interferometer 315. The long arm 325 contains an optical fibre delay loop 327, while the short arm 329 contains a fibre optic phase modulator 331. The length difference between the long arm 325 and the short arm 329 corresponds to an optical propagation delay of $t_{delay}$. Typically the length of the delay loop 327 is chosen to produce a delay $t_{delay}$~5 ns. A photon travelling through the long arm 325 will lag that travelling through the short arm 329 by a time of $t_{delay}$ at the exit 333 of the interferometer. The two arms are combined together with a fibre optic coupler 333.

The output of Alice's interferometer 315 is multiplexed with the bright clock laser 317 at the WDM coupler 319. The bright clock laser 317 is controlled by biasing electronics 321. The clock laser 317 may emit at a different wavelength from that of the single photon source 303, so as to facilitate their easy separation at Bob's end. For example the single photon source may operate at 1.3 μm and the clock laser at 1.55 μm or vice versa.

Bob's equipment 353 is similar to Alice's equipment 301 and comprises a WDM coupler 355, a clock recovery unit 357, a polarisation controller 359, an imbalanced Mach-Zender interferometer 361, two single photon detectors 363, 365 and biasing electronics 343.

Bob's interferometer 361 contains an entrance fibre coupler 369, a long arm 371 containing a delay loop 373 and a variable delay line 375, a short arm 377 containing a phase modulator 379, the long arm 371 and the short arm 377 are combined with an exit 50/50 fibre coupler 378.

Bob first de-multiplexes the transmitted signal received from fibre 351 using WDM coupler 355. The bright clock laser 317 signal is routed to an optical receiver 357 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. The efficiency of this scheme may be improved if Alice sends the clock in an orthogonal polarisation state to the signal pulses. Bob then uses a polarisation controller and a polarising beamsplitter to separate the signal and clock pulses. Alternatively Bob may detect the clock on a separate fibre or using a timing reference.

The single photon pulses are fed into a polarisation controller 359 to restore the original polarisation of the signal pulses.

The single photon pulses then passes Bob's interferometer 361. The entrance fibre coupler 369 divides the incident pulses. The long arm 371 of Bob's interferometer 361 contains an optical fibre delay loop 373 and a variable fibre delay line 375, and the short arm 377 contains a phase modulator 379. The two arms 371, 377 are connected to a 50/50 polarisation maintaining fibre coupler 378 with a single photon detector A, 363, B, 365 attached to each output arm.

There are four routes for a signal pulse travelling from the entrance of Alice's interferometer to the exit of Bob's interferometer:

i. Alice's Long Arm 325-Bob's Long Arm 371
 ii. Alice's Long Arm 325-Bob's Short Arm 377
 iii. Alice's Short Arm 329-Bob's Long Arm 371
 iv. Alice's Short Arm 329-Bob's Short Arm 377

The variable delay line 375 at Bob's interferometer 361 is adjusted to make the length of routes (ii) and (iii) almost equal within the coherence time of the single photon source and thereby ensure interference of paths (ii) and (iii). Photons taking paths (ii) and (iii) arrive at nearly the same time at the exit coupler 378, corresponding to the central 2 peaks in FIG. 8b. Photons taking path (i) have a positive delay $t_{delay}$ (later arrival time), and those taking path (iv) have a negative delay $t_{delay}$ compared to paths (ii) and (iii).

The variable fibre delay line 375 can either be an airgap, or a fibre stretcher, driven by a piezo-electric actuator. Alternatively, the two delays can be balanced by carefully controlling the length of fibre in Alice's and Bob's interferometers. Fine adjustment of the length of the two optical paths can be achieved through the calibration of zero phase delay in the two modulators 315, 361.

Only photons arriving in the central windows shown in FIG. 8b undergo interference, and thus are of interest. Bob gates his detectors 363, 365 to record only photons in the central windows and not those in the earlier or later satellite windows.

The apparatus of FIG. 8a is similar to that of FIG. 3a or 7a. However, in the apparatus of FIG. 8a, the photons generated with the first or second polarisation states are injected into the interferometer with different polarisation, rather than the same polarisation as in the previous examples. It is thus necessary to apply different modulations to the photons generated with the first or second polarisations.

FIG. 8b is a plot of the probability of a photon arriving at either of Bob's detectors 363, 365 against time.

Figure 9:
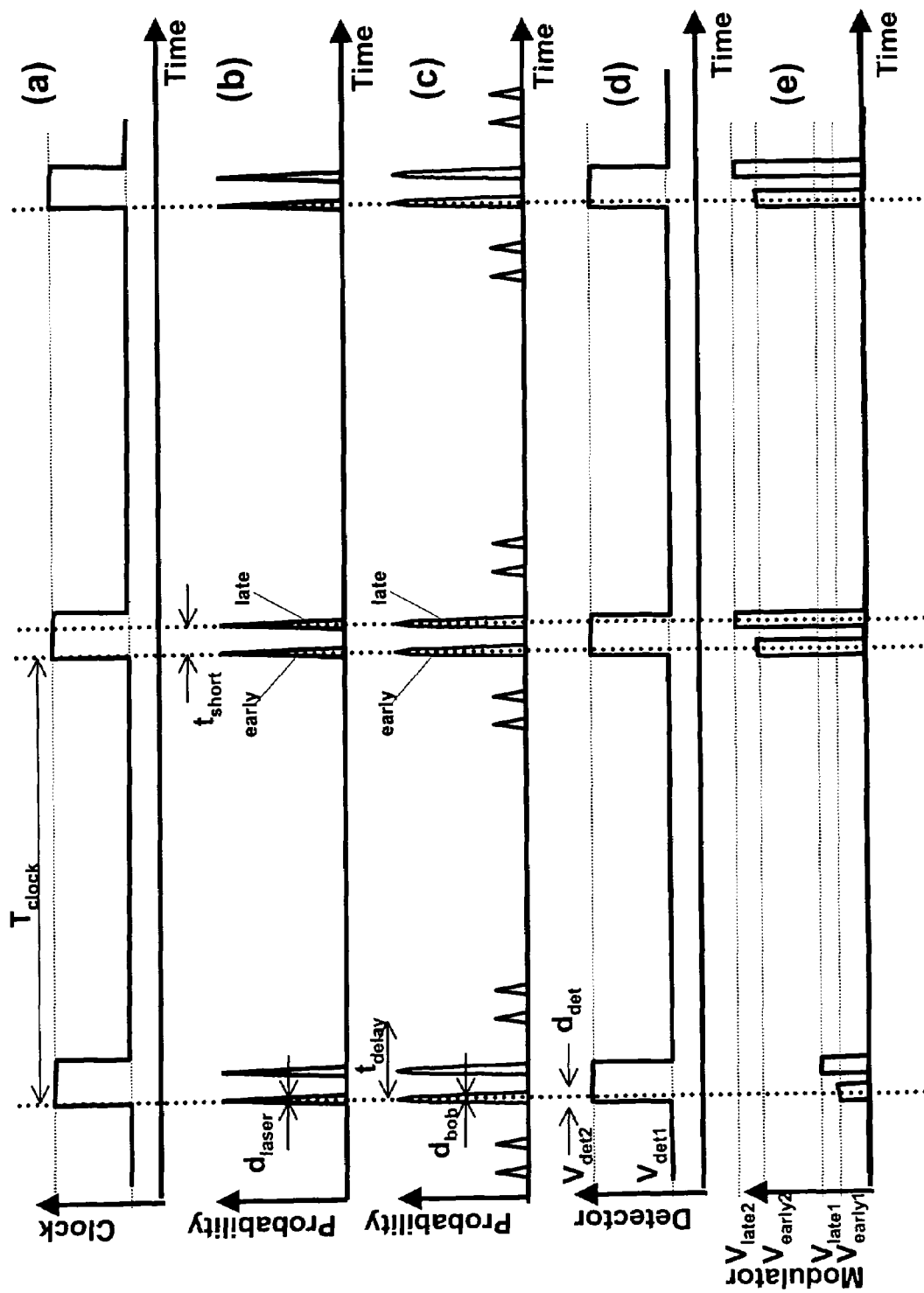
FIGS. 9(a) to 9(e) are an alternative sequence of plots against time schematically showing how Alice should time her pulses and how Bob should gate the detector using the system of FIG. 7 and in accordance with an embodiment of the present invention.

FIG. 9 shows a biasing scheme which is suitable for the apparatus of FIG. 7a.

FIG. 9a is a plot of the clock signal against time as per FIG. 4a.

FIG. 9b is a plot of probability of a photon pulse entering Alice's interferometer 315 against time as per FIG. 4b.

FIG. 9c is a plot of the probability of a photon arriving at either of Bob's detectors against time as per FIG. 4c.

FIG. 9d is a plot of the gating bias applied to the detector against time as per FIG. 5d.

FIG. 9e is a plot of the bias applied to the phase modulator against time. It is similar to that in FIG. 5e, except that Alice and Bob apply different voltage levels during the times when photons from the early and late paths pass their phase modulators. For example, when photons from early path pass, Alice applies voltages from a set of values $V_{early1}$, $V_{early2}$ etc. When photons from the late path pass, Alice applies voltages from a different set of values $V_{late1}$, $V_{late2}$ etc. In both cases the voltages are chosen to give the desired phase shift for that particular polarisation. Bob will also apply different voltages to the late and early photons, which are not necessarily the same as those applied by Alice.

The detector may be gated with one voltage pulse whose duration covers both the early and late photons arrival time (as shown FIG. 9d) or with two separate voltage pulses as per FIG. 4d.

Figure 10:
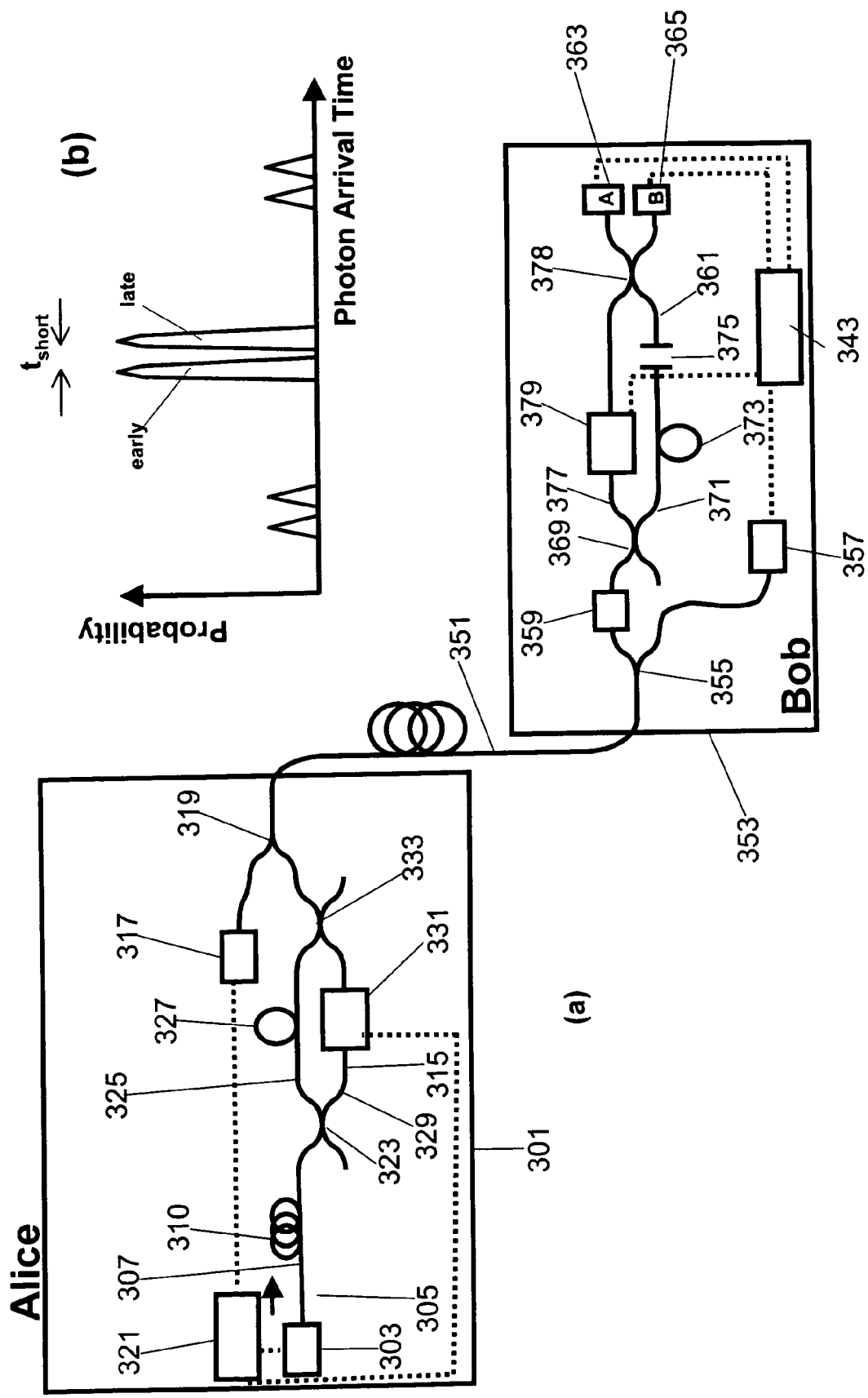
FIG. 10(a) is a communication system in accordance with a further embodiment of the present invention using phase encoding and FIG. 10(b) is a schematic plot of the probability of a photon being present in a pulse received by a detector against arrival time at the detector.

FIG. 10a shows a quantum cryptographic system using an unpolarised single photon source and based upon phase encoding in a polarisation maintaining fibre interferometer. It is similar to that shown in FIG. 8a. To avoid unnecessary repetition, same numerals are used for components.

As shown in FIG. 10a, Alice uses a sufficiently long polarisation maintaining fibre loop 310 to separate in time photons of orthogonal polarisations emitted by the single photon source 303. Photons polarised along the slow axis of a polarisation maintaining fibre travel in a speed slower than those polarised along the fast axis. Long polarisation maintaining fibre 310 replaces the polarising beamsplitter 305, the short delay line 309 of polarisation maintaining fibre, the polarisation maintaining fibre 311, a polarising beam combiner 313 of FIG. 8a.

FIG. 10b is a schematic plot of the probability of a photon being present in a pulse received by a detector against arrival time at the detector.

Figure 11:
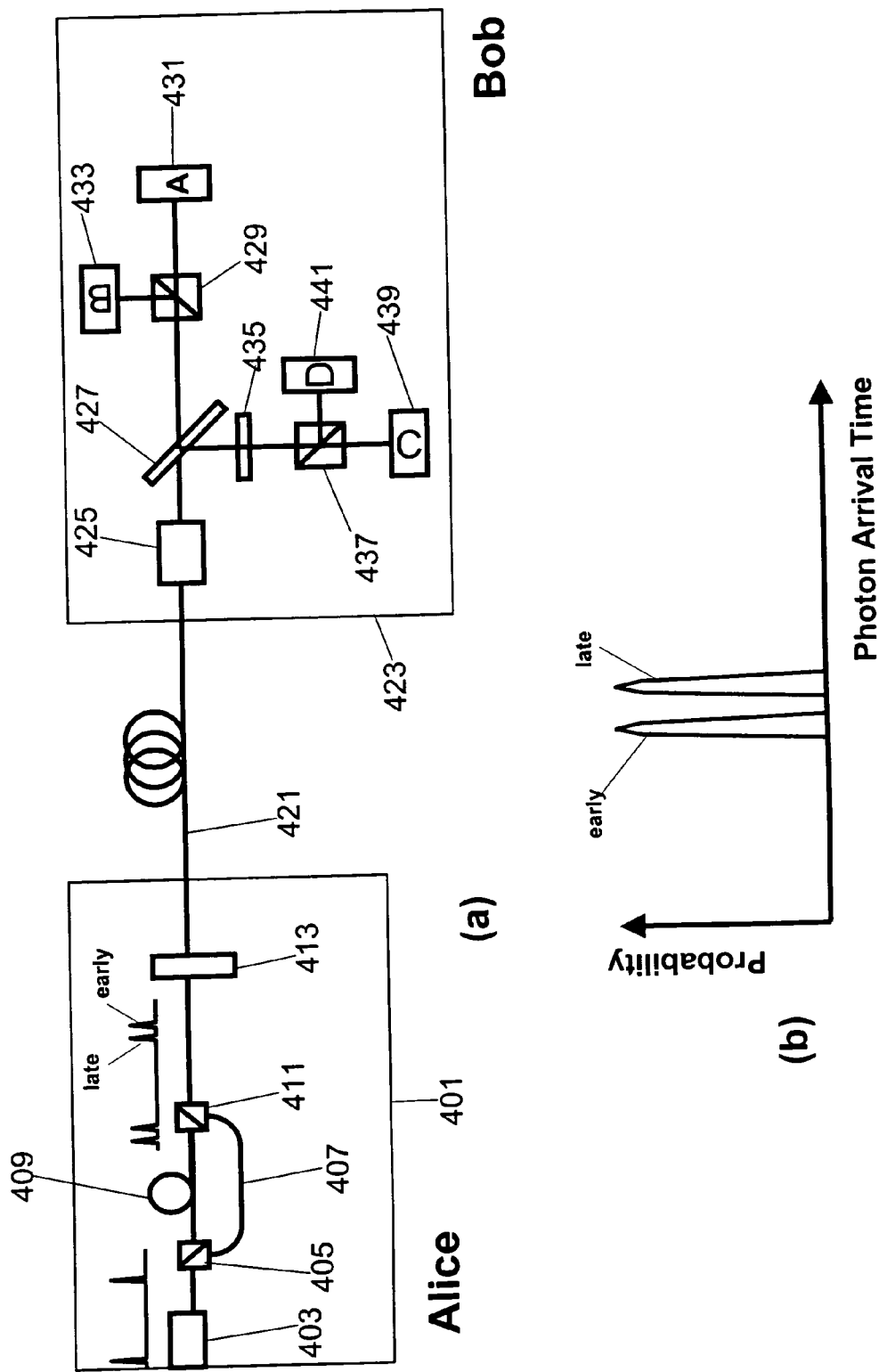
FIG. 11(a) is a communication system in accordance with a further embodiment of the present invention using polarisation encoding and FIG. 11(b) is a schematic plot of the probability of a photon being present in a pulse received by a detector against arrival time at the detector.

FIG. 11a shows an apparatus for quantum cryptography based an unpolarised single photon source and using polarisation encoding.

During each clock signal, the single photon source produces one single photon pulse with a random polarisation.

Alice's apparatus 401 comprises a single photon source 403, a polarising beamsplitter 405, a polarisation maintaining fibre 407, a short polarisation maintaining delay loop 409, a polarising beam combiner 411, a polarisation encoder 413, biasing electronics (not shown) and a clock system (not shown).

Randomly polarised single photon pulses outputted from the single photon source 403 are fed into the polarising beamsplitter 405. The first output of the polarising beamsplitter 405 is connected to the first input of a polarising beam combiner 411 via a short polarisation maintaining delay loop 409. The second output of the polarising beamsplitter 405 is connected to the second input of the polarisation beam combiner 411 through a polarisation maintaining fibre 407. The path with the short delay loop 409 is longer than that with the polarisation maintaining fibre 407, with the effect that photons taking this path are delayed relative to the other by a time $t_{short}$. The polarising beamsplitter 405, the polarisation beam combiner 411 and the polarisation maintaining fibre 407 and 409 are aligned in such a way that signal has maximal output at the output of the polarisation beam combiner 411. Signal pulses taking either arm will leave the polarising beam combiner 411 with orthogonal polarisations with a delay of $t_{short}$ for one of the two polarisations.

The single photon pulses are then randomly and individually encoded using a polarisation rotator 413 with variable polarisation rotation. For the BB84 protocol one of four different polarisation rotations is applied: 0°, 45°, 90°, and 135°. Alice associates rotations 0° and 90° with bit=0 and bit=1 in a first encoding basis. Rotations 45° and 135° are associated with bit=0 and bit=1 in a second encoding basis.

The encoded photons are then transmitted to the receiver Bob 423 along an optical fibre link 421. A clock signal may also be sent.

Bob 423 first uses a polarisation rotator 425 to recover the original polarisation of the signal pulses. The single photon pulses are either reflected or transmitted by a 50/50 non-polarising beamsplitter 427. Photons transmitted by the non-polarising beamsplitter 427 are analysed with a polarisation beamsplitter 429 and two single photon detectors A, 431 and B, 433. Bob associates this with a measurement in the first basis.

Bob sets the polarisation controller 429 so that the delayed photons encoded by Alice with a polarisation rotation of 0° produce a maximum count rate in detector A 431 and minimum count rate in B 433. Bob can then associate a count in detector A 431 as bit=0 and a count in detector B 433 as bit=1 for the delayed photons. For the undelayed photons, Bob associates a count in detector A 431 as bit=1 and a count in B 433 as bit=0.

The photons reflected by the non-polarising beamsplitter 427 will first pass through a 45° polarisation rotator 435, and their polarisation then measured by a polarisating beamsplitter 437 and two single photon detectors C, 439, D, 441. Alternatively the polarisation rotator 435 can be omitted and the second polarisation beamsplitter 437 and detectors C, 439, D, 441 can be rotated by 45°. Bob associates a count in detector C 439 as bit=0 and a count in detector D 441 as bit=1 for the delayed photons. Bob associates this with a measurement in the second basis. For the undelayed photons, Bob associates a count in detector C 439 as bit=1 and a count in D 441 as bit=0.

This set-up can be used to implement quantum key distribution using the BB84 in the manner described previously or the B92 protocol [C H Bennett, "Quantum cryptography using any two non-orthogonal states" Phys Rev Lett 68, 3121-3124 (1992)].

FIG. 11b is a plot of the probability of a photon arriving at any of detectors A, 431, B, 433, C, 439 and D, 441 against time. Two peaks due to photons taking either the early path or the late path are seen.

Different polarisation of the early and late signal pulses can be compensated by Alice's polarisation rotator 413. The single photon pulses are then randomly and individually encoded using a polarisation rotator 413 with variable polarisation rotation. However the late pulses are modulated differently by the polarisation rotator 413. For the BB84 protocol one of four different polarisation rotations is applied: 0°, 45°, 90°, and 135° for the early pulses. Since the polarisation of the late pulses is orthogonal to that of the early pulses, we compensate by adding (or subtracting, if appropriate) an extra 90° rotation for the late pulses, so as to make the polarisations of the late and early pulses identical. For BB84 protocol one of the four different polarisation rotations is applied: 90°, 135°, 180° (0°) and 225° (45°). Alice associates rotations 0° and 90° with bit=0 and bit=1 in a first encoding basis for the early pulses, and 90° and 135° with bit=0 and bit=1 in a first encoding basis for the late pulses; Rotations 45° and 135° are associated with bit=0 and bit=1 in a second encoding basis for the early pulses, and rotations 180° (0°) and 225° (45°) are associated with bit=0 and bit=1 in a second encoding basis for the late pulses.

The receiver's apparatus is similar to that described previously.

In this case, the orthogonally polarised pulses are modulated differently by encoding means. So, there is no need for Bob's detector to distinguish photon count from the early path or the late path.

It will be apparent to anyone skilled in the art that the B92 protocol may also be applied to this embodiment.

Figure 12:
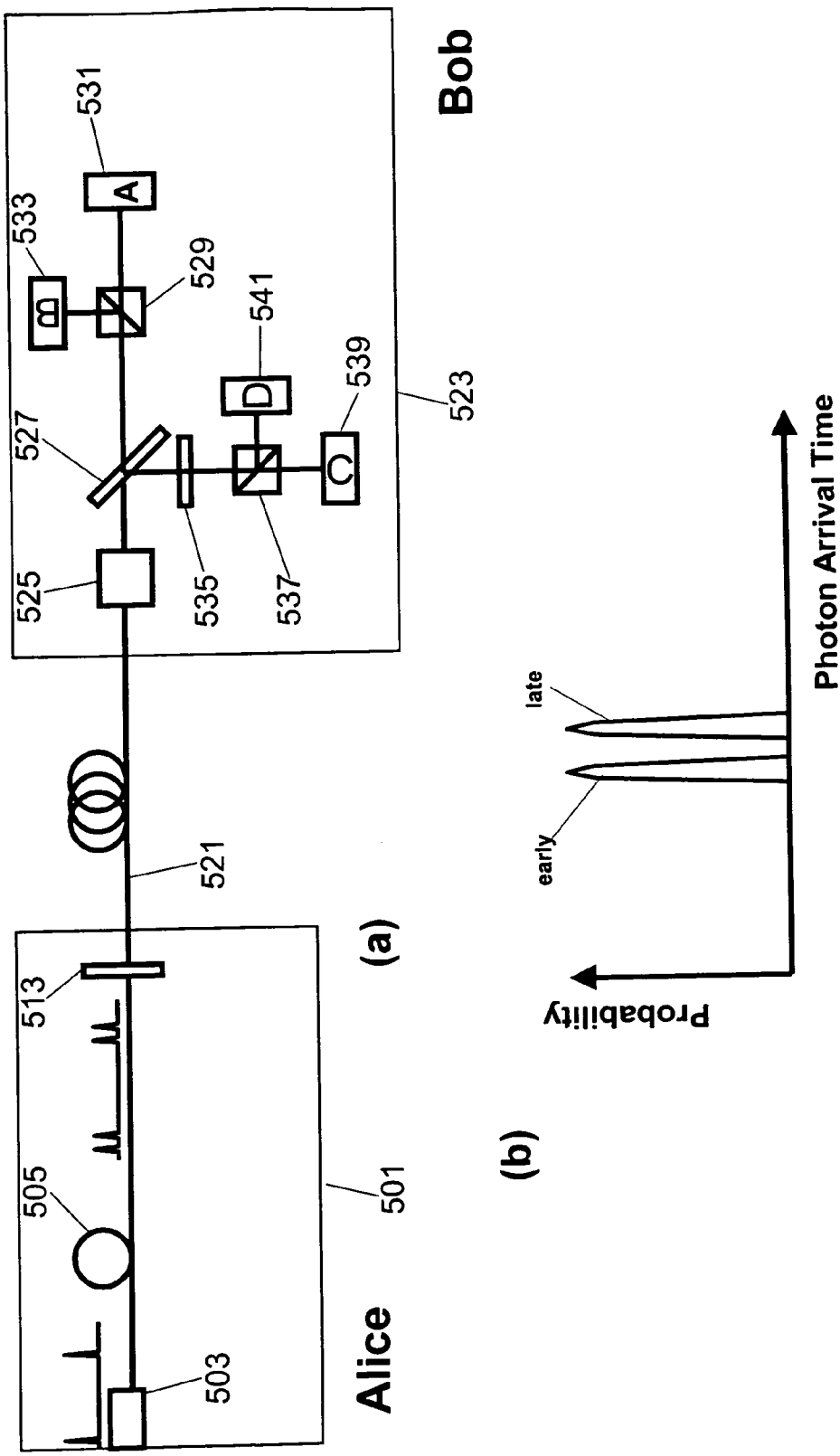
FIG. 12(a) is a communication system in accordance with a further embodiment of the present invention using polarisation encoding and FIG. 12(b) is a schematic plot of the probability of a photon being present in a pulse received by a detector against arrival time at the detector.

FIG. 12a is similar to FIG. 11a. A polarisation maintaining fibre delay loop is used to delay photons in one of two orthogonal polarisations.

During each clock signal, the single photon source produces one single photon pulse with a random polarisation.

Alice's apparatus 501 comprises a single photon source 503, a polarisation maintaining fibre delay loop 505, a polarisation encoder 513, biasing electronics (not shown) and a clock system (not shown).

Randomly polarised single photon pulses outputted from the single photon source 503 are fed into the polarisation maintaining fibre delay loop 505. The polarisation maintaining fibre causes photons having a first polarisation direction to travel down it at one speed and photons having a second polarisation direction to travel down it at a different speed. The fibre may be made long enough so that a clear time gap exists between the photons of the two different polarisations exiting the fibre.

The single photon pulses are then randomly and individually encoded using a polarisation rotator 513 with variable polarisation rotation. For the BB84 protocol one of four different polarisation rotations is applied: 0°, 45°, 90°, and 135°. Alice associates rotations 0° and 90° with bit=0 and bit=1 in a first encoding basis. Rotations 45° and 135° are associated with bit=0 and bit=1 in a second encoding basis.

The encoded photons are then transmitted to the receiver Bob 523 along an optical fibre link 521. A clock signal may also be sent.

Bob 523 first uses a polarisation controller 525 to recover the original polarisation of the signal pulses. The single photon pulses are either reflected or transmitted by a 50/50 non-polarising beamsplitter 527. Photons transmitted by the non-polarising beamsplitter 527 are analysed with a polarisation beamsplitter 529 and two single photon detectors A, 531 and B, 533. Bob associates this with a measurement in the first basis.

Bob sets the polarisation controller 529 so that the delayed photons encoded by Alice with a polarisation rotation of 0° produce a maximum count rate in detector A 531 and minimum count rate in B 533. Bob can then associate a count in detector A 531 as bit=0 and a count in detector B 533 as bit=1 for the delayed photons. For the undelayed photons, Bob associates a count in detector A 531 as bit=1 and a count in B 533 as bit=0.

The photons reflected by the non-polarising beamsplitter 527 will first pass through a 45° polarisation rotator 535, and their polarisation then measured by a polarising beamsplitter 537 and two single photon detectors C, 539, D, 541. Alternatively the polarisation rotator 535 can be omitted and the second polarisation beamsplitter 537 and detectors C, 539, D, 541 can be rotated by 45°. Bob associates a count in detector C 539 as bit=0 and a count in detector D 541 as bit=1 for the delayed photons. Bob associates this with a measurement in the second basis. For the undelayed photons, Bob associates a count in detector C 539 as bit=1 and a count in D 541 as bit=0.

This set-up can be used to implement quantum key distribution using the BB84 in the manner described previously or the B92 protocol [C H Bennett, "Quantum cryptography using any two non-orthogonal states" Phys Rev Lett 68, 3121-3124 (1992)].

FIG. 12*b* is a plot of the probability of a photon arriving at any of detectors A, 531, B, 533, C, 539 and D, 541 against time. Two peaks due to photons taking either the early path or the late path are seen.

Figure 13:
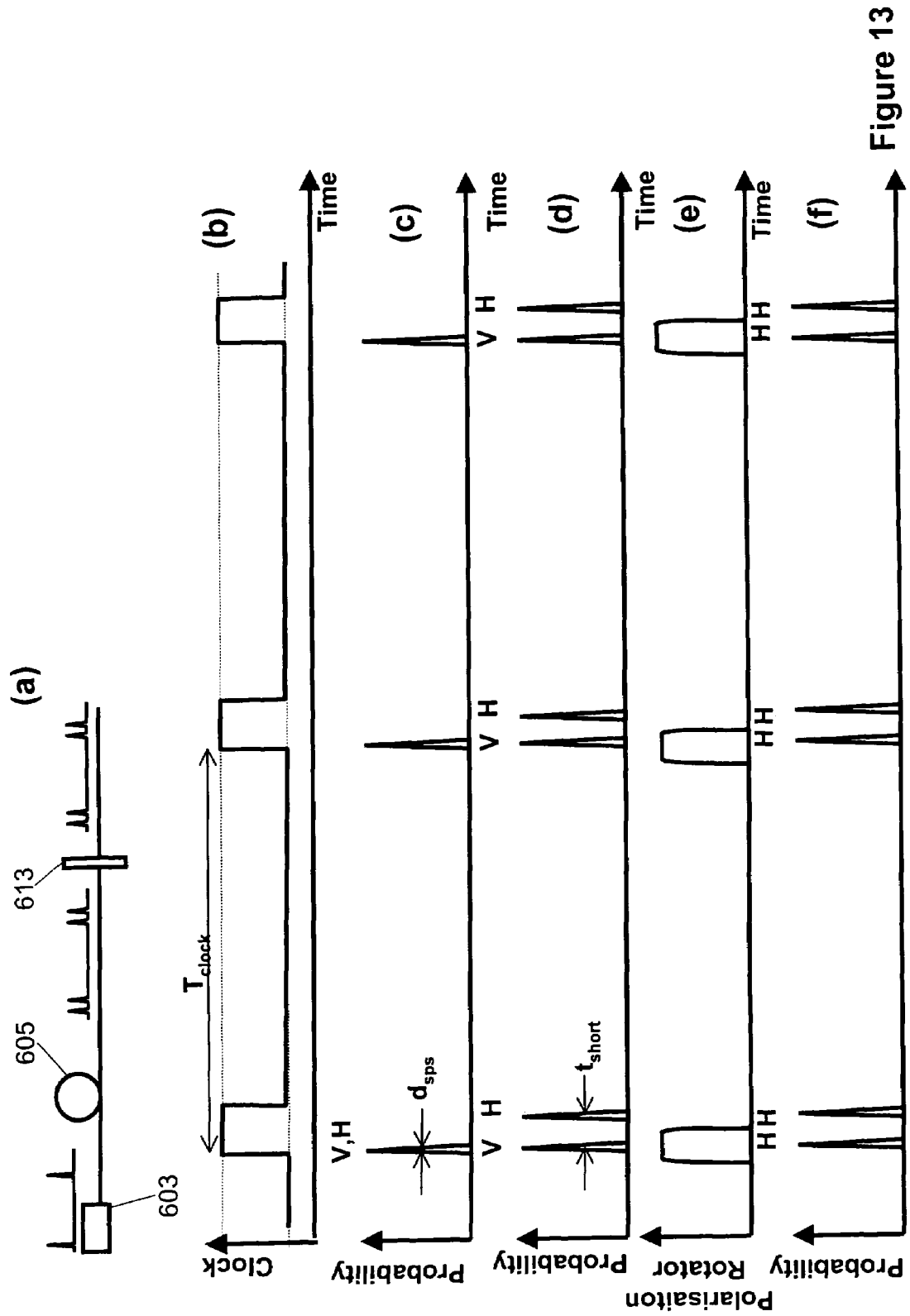
FIG. 13(a) schematically illustrates an apparatus for outputting photons having a single polarisation in accordance with an embodiment of the present invention.
FIGS. 13(b) to 13(f) are plots against time of the operation or operating signals applied to the apparatus of FIG. 13(a) to demonstrate how the device should be synchronised.

FIG. 13*a* shows an apparatus for outputting polarised single photon pulses. The apparatus comprises an unpolarised single photon emitter 603 driven by either optical or electrical stimulation, a polarisation maintaining fibre delay loop 605, a polarisation rotator 613, and biasing electronics (not shown).

The single photons emitted from the said single photon source 603 with random polarisations or a random mixture of two orthogonal polarisations. The time duration of such single photon pulse is $d_{sps}$. The single photons then passed through a polarisation maintaining delay loop 613. The speed of a photon travelling depends on its polarisation. Photons polarised along the fast axis travels at a faster speed than those polarised along the slow axis of the polarisation maintaining fibre. So, after the polarisation maintaining delay loop 613, photons of orthogonal polarisations separate in time with a gap $t_{short}$ and form two pulses, an early pulse and a late pulse.

The length of the polarisation maintaining fibre delay loop 613 is selected so that the time gap $t_{short}$ is larger than the single photon pulse duration $d_{sps}$, and that the late pulses or the early pulses can be selectively rotated by the polarisation rotator 613.

The polarisation rotator 613 is synchronised with the single photon emitter 603. The rotator only rotate polarisation of one of the pulses, either the early or late pulse within each clock cycle, by 90°. In this way, the early signal pulses and the late signal pulses will have same polarisation after the polarisation rotator 613.

FIG. 13*b* to 13*e* shows how devices are timed.

FIG. 13*b* is a plot of the clock signal against time.

FIG. 13*c* is a plot of the probability of a photon pulse entering the polarisation maintaining delay loop 605 as a function of time. Here, the photon pulse is not polarised.

FIG. 13*d* is a plot of the probability of a photon pulse leaving the polarisation maintaining delay loop 605 as a function of time. Since photons of orthogonal linear polarisation travel at different speed, vertically polarised and horizontally polarised photons are separated in time by a gap $t_{short}$. There are two time windows when a photon may leave the delay loop. The early and the late pulses are orthogonally linearly polarised.

FIG. 13*e* is a plot of the bias applied on the polarisation rotator as a function of time.

FIG. 13*f* is a plot of the probability of a photon pulse leaving the polarisation rotator 613 as a function of time. Note that the early and late pulses now have same linear polarisation.

Figure 14:
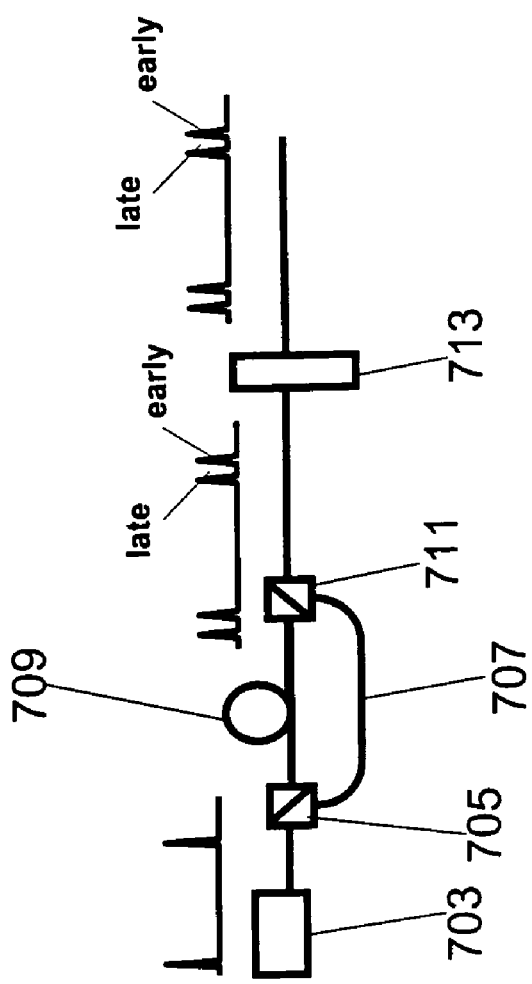
FIG. 14 schematically illustrates a further apparatus in accordance with an embodiment of the present invention configured to emit photons having the same polarisation.

FIG. 14 shows an apparatus for outputting polarised single photon pulses. The apparatus comprises an unpolarised single photon emitter 703 driven by either optical or electrical stimulation, a polarising beam splitter 705, a polarisation maintaining fibre delay loop 709, a short polarisation maintaining fibre link 707, a polarising beam combiner 711, and a polarisation rotator 713.

Single photon pulses are generated by a single photon source 703 with a random polarisation or a random mixture of two orthogonal linear polarisations.

The randomly polarised single photon pulses are fed into the polarising beamsplitter 705. The first output of the polarising beamsplitter 705 is connected to the first input of a polarising beam combiner 711 via a polarisation maintaining delay loop 709 (late path). The second output of the polarising beamsplitter 705 is connected to the second input of the polarising beam combiner 711 through a polarisation maintaining fibre 707 (early path). The late path 709 is longer than the early path 707, with the effect that photons taking this path are delayed relative to the other by a time $t_{short}$. The two outputs of the polarising beamsplitter 305 and the two inputs of the polarising beam combiner 711 are aligned to a particular axis, usually the slow axis, of the polarisation maintaining fibre. Photons taking the two different paths are orthogonally polarised and separated in the clock cycle relative to one another when leaving the polarising beam combiner 711.

The length of the polarisation maintaining fibre delay loop 709 is selected so that the time gap $t_{short}$ is larger than the single photon pulse duration $d_{sps}$, and that the late pulses or the early pulses can be selectively rotated by the polarisation rotator 613.

After passing the polarisation beam combiner 711, there are two time windows (early and late) in which a single photon may exist. Photons within different widows will have orthogonal linear polarisations.

The polarisation rotator 713 is synchronised with the single photon emitter, and it is gated on only to rotate the polarisation of later pulses by 90°. In this way, a single photon leaving the polarisation rotator 713 will have fixed linear polarisation, which is independent of its original polarisation.

FIG. 14 is similar to FIG. 13*a*. The only difference is that means with polarisation splitting and combining are used to separate photons of orthogonal polarisations in time in FIG. 14, while in FIG. 13*a* photons are separated by their different travelling speed in a polarisation maintaining fibre loop.

The invention claimed is:

1. A photon emitter comprising: a photon generator configured to generate randomly polarized photons separable into a first polarisation state and a second polarisation state, the first polarisation state being orthogonal to the second polarisation state; and time delay means receiving said randomly polarized photons and being configured to delay photons having the second polarisation state with respect to those having the first polarisation state such that photons which enter the time delay means with the first polarisation exit the time delay means at a different time to photons which enter the time delay means with the second polarization;

encoding means, wherein photons which have passed through the time delay means are passed into an encoding means, wherein said encoding means are configured to encode the phase of a photon and comprise a first interferometer, said first interferometer comprising an entrance coupler connected to a long arm and a short arm, said long arm and short arm being joined at their other ends by an exit coupler, one of said arms having first phase variation means which allows the phase of a photon passing through that arm to be set to one of at least two values, wherein the photons are received by a receiver, and the receiver comprises a second interferometer, the second interferometer comprising an entrance coupler connected to a long arm and a short arm, said long arm and short arm being joined at their other ends by an exit coupler, one of said arms having second phase variation means which allows the phase of a photon passing through that arm to be set to one of at least two values; and further comprising directing means configured to ensure that photons which have passed through the short arm of the first interferometer are directed down the long arm of the second interferometer and photons which have passed through the long arm of the first interferometer pass through the short arm of the second interferometer, wherein the directing means comprises first polarising means configured to allow photons which have traveled through different arms of the first interferometer different polarisations and second polarising means which distinguish between the photons having different polarisations and direct them down the appropriate arm of the second interferometer.

2. A photon emitter according to claim 1, wherein the time delay means comprises a polarising beamsplitter which directs photons having the first polarisation state along a first path and photons having the second polarisation state along a second path and combining means to combine the first and second paths, one of the paths being longer than the other path.

3. A photon emitter according to claim 2, wherein one of the paths is provided with means to rotate the polarisation of photons passing through said path such that photons from the first path and the second path at the combining means have the same polarisation.

4. A photon emitter according to claim 1, wherein the time delay means comprises a single path configured to allow photons having a first polarisation state to travel at a different speed to photons with a second polarisation state.

5. A photon emitter according to claim 1, wherein the encoding means is capable of performing a different encoding operation on photons with the first polarisation state than those with the second polarisation state.

6. A photon emitter according to claim 1, wherein the time delay means comprises a polarising beamsplitter which directs photons having the first polarisation state along a first path and photons having the second polarisation state along a second path and combining means to combine the first and second paths, one of the paths being longer than the other path and wherein said entrance coupler has first and second inputs and first and second outputs, wherein the first and second outputs are connected to the long arm and short arm of the first interferometer, and photons which pass through the first path and second path are coupled into the same input of the entrance coupler.

7. A photon emitter according to claim 6, wherein said first phase variation means is capable of providing a different modulation to photons which pass through the first path than those which path through the second path, such that photons generated with the first or second polarisation state exit the interferometer with the same phase state.

8. A photon emitter according to claim 1, wherein the time delay means comprises a polarising beamsplitter which directs photons having the first polarisation state along a first path and photons having the second polarisation state along a second path and combining means to combine the first and second paths, one of the paths being longer than the other path and wherein said entrance coupler has first and second inputs and first and second outputs connected, wherein said first and second outputs are connected to said long arm and short arm of the first interferometer, and said entrance coupler also provides the combining means for the first path and the second path such that photons which follow the first path enter the entrance coupler by the first input and photons which follow the second path enter the entrance coupler by the second input.

9. A photon emitter according to claim 1, further comprising means to rotate the polarisation of the delayed photons by 90°, such that photons are emitted having the same polarisation.

10. A photon emitter according to claim 1, wherein the photon generator comprises a single photon source.

11. A photon emitter according to claim 10, wherein the single photon source emits a single photon pulse having a duration in a range of 100 ps to 1 ns.

12. A quantum communication system comprising:

a photon emitter comprising:

a photon generator configured to generate randomly polarized photons separable into a first polarisation state and a second polarisation state the first polarisation state being orthogonal to the second polarisation state;

time delay means receiving said randomly polarized photons being configured to delay photons having the second polarisation state with respect to those having the first polarisation state; and encoding means, wherein photons which have passed through the time delay means are passed into an encoding means, the communication system further comprising a receiver having means to decode the photons and a detector, wherein photons which enter the time delay means with the first polarisation exit the time delay means at a different time to photons which enter the time delay means with a second polarisation and photons with the first polarisation are temporally separated from photons with the second polarisation when entering the encoding means, wherein said encoding means are configured to encode the phase of a photon and comprise a first interferometer, said interferometer comprising an entrance coupler connected to a long arm and a short arm, said long arm and short arm being joined at their other ends by an exit coupler, one of said arms having first phase variation means which allows the phase of a photon passing through that arm to be set to one of at least two values, the receiver comprising a second interferometer, the second interferometer comprising an entrance coupler connected to a long arm and a short arm, said long arm and short arm being joined at their other ends by an exit coupler, one of said arms having second phase variation means which allows the phase of a photon passing through that arm to be set to one of at least two values; and the quantum communication system further comprising directing means configured to ensure that photons which have passed through the short arm of the first interferometer are directed down the long arm of the second interferometer and photons which have passed through the long arm of the first interferometer pass through the short arm of the second interferometer, wherein the directing means comprises first polarising means configured to allow photons which have traveled through different arms of the first interferometer different polarisations and second polarising means which distinguish between the photons having different polarisations and direct them down the appropriate arm of the second interferometer.

13. A quantum communication system according to claim 12, further comprising means to apply a gating signal to the detector, said gating signal being provided to switch the detector between an 'on mode' where photons may be detected and an 'off mode' where photons may not be detected.

14. A quantum communication system according to claim 13, wherein the detector is in an "on mode" for the two intervals when a photon is expected after following the first or second path in the time delay means.

15. A system according to claim 12, further comprising means to communicate a clock signal between emitter and receiver.

16. A system according to claim 12, wherein a clock pulse is sent from the emitter to the receiver with each photon from the generator.

17. A system according to claim 16, wherein the clock signal has a different wavelength to the photons emitted from the photon generator.

18. A system according to claim 16, wherein the clock signal has a different polarisation to that of the photons sent to the receiver from the photon generator.

19. A system comprising:
a photon emitter comprising:
  a photon generator configured to generate randomly polarized photons separable into a first polarisation state and a second polarisation state the first polarisation state being orthogonal to the second polarisation state;
  time delay means receiving said randomly polarized photons being configured to delay photons having the second polarisation state with respect to those having the first polarisation state; and
  encoding means, wherein photons which have passed through the time delay means are passed into an encoding means,
  the communication system further comprising a receiver having means to decode the photons and a detector,
wherein photons which enter the time delay means with the first polarisation exit the time delay means at a different time to photons which enter the time delay means with a second polarisation and photons with the first polarisation are temporally separated from photons with the second polarisation when entering the encoding means, wherein said encoding means are configured to encode the phase of a photon and comprise a first interferometer, said interferometer comprising an entrance coupler connected to a long arm and a short arm, said long arm and short arm being joined at their other ends by an exit coupler, one of said arms having first phase variation means which allows the phase of a photon passing through that arm to be set to one of at least two values, the receiver comprising a second interferometer, the second interferometer comprising an entrance coupler connected to a long arm and a short arm, said long arm and short arm being joined at their other ends by an exit coupler, one of said arms having second phase variation means which allows the phase of a photon passing through that arm to be set to one of at least two values; and means to vary the path length of one of the arms of at least one of the interferometers such that photon pulses which take the short arm of first interferometer and the long arm of the second interferometer take the same time to pass through both interferometers as photon pulses which pass through the long arm of the first interferometer and the short arm of the second interferometer.

20. A quantum communication system comprising:
a photon emitter comprising:
  a photon generator configured to generate randomly polarized photons separable into a first polarisation state and a second polarisation state the first polarisation state being orthogonal to the second polarisation state;
  time delay means receiving said randomly polarized photons being configured to delay photons having the second polarisation state with respect to those having the first polarisation state; and
  encoding means, wherein photons which have passed through the time delay means are passed into an encoding means,
  the communication system further comprising a receiver having means to decode the photons and a detector,
wherein photons which enter the time delay means with the first polarisation exit the time delay means at a different time to photons which enter the time delay means with a second polarisation and photons with the first polarisation are temporally separated from photons with the second polarisation when entering the encoding means; and means to apply a gating signal to the detector, said gating signal being provided to switch the detector between an 'on mode' where photons may be detected and an 'off mode' where photons may not be detected, wherein the detector is in an 'on mode' from the time when it expects to receive a photon which has followed the shortest path through the time delay means until and including the time when it expects to receive a photon which has followed the longest path through the time delay means.

21. A quantum communication system comprising:
a photon emitter comprising:
  a photon generator configured to generate randomly polarized photons separable into a first polarisation state and a second polarisation state the first polarisation state being orthogonal to the second polarisation state;
  time delay means receiving said randomly polarized photons being configured to delay photons having the second polarisation state with respect to those having the first polarisation state; and encoding means, wherein photons which have passed through the time delay means are passed into an encoding means, the communication system further comprising a receiver having means to decode the photons and a detector, wherein photons which enter the time delay means with the first polarisation exit the time delay means at a different time to photons which enter the time delay means with a second polarisation and photons with the first polarisation are temporally separated from photons with the second polarisation when entering the encoding means, wherein said encoding means are configured to encode the phase of a photon and comprise a first interferometer, said interferometer comprising an entrance coupler connected to a long arm and a short arm, said long arm and short arm being joined at their other ends by an exit coupler, one of said arms having first phase variation means which allows the phase of a photon passing through that arm to be set to one of at least two values, the receiver comprising a second interferometer, the second interferometer comprising an entrance coupler connected to a long arm and a short arm, said long arm and short arm being joined at their other ends by an exit coupler, one of said arms having second phase variation means which allows the phase of a photon passing through that arm to be set to one of at least two values; and further comprising means to apply a gating signal to the detector, said gating signal being provided to switch the detector between an 'on mode' where photons may be detected and an 'off mode' where photons may not be detected wherein the detector is in an off mode when it expects to receive photons which have passed through either the long arms of both interferometers or the short arms of both interferometers.

* * * * *